(12) United States Patent
Chang et al.

(10) Patent No.: US 10,290,902 B2
(45) Date of Patent: May 14, 2019

(54) ELECTROLYTE FOR LITHIUM METAL BATTERY, LITHIUM METAL BATTERY INCLUDING THE ELECTROLYTE, AND METHOD OF MANUFACTURING THE LITHIUM METAL BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Wonseok Chang, Seoul (KR); Toshinori Sugimoto, Hwaseong-si (KR); Yonggun Lee, Suwon-si (KR); Hongsoo Choi, Seoul (KR); Hyorang Kang, Anyang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 200 days.

(21) Appl. No.: 15/398,541

(22) Filed: Jan. 4, 2017

(65) Prior Publication Data
US 2017/0346137 A1    Nov. 30, 2017

(30) Foreign Application Priority Data
May 27, 2016    (KR) .......................... 10-2016-0065693

(51) Int. Cl.
*H01M 10/056*    (2010.01)
*H01M 10/0568*    (2010.01)
(Continued)

(52) U.S. Cl.
CPC ....... *H01M 10/0568* (2013.01); *H01M 4/134* (2013.01); *H01M 10/052* (2013.01);
(Continued)

(58) Field of Classification Search
CPC ........ H01M 4/134; H01M 4/382; H01M 4/40; H01M 10/0568; H01M 10/052;
(Continued)

(56) References Cited

U.S. PATENT DOCUMENTS

| 9,831,529 B2 | 11/2017 | Chang et al. |
| 2008/0044734 A1* | 2/2008 | Ryu ........................ H01M 4/13 |
| | | 429/326 |

(Continued)

FOREIGN PATENT DOCUMENTS

| JP | 2009245911 A | 10/2009 |
| JP | 2010073489 A | 4/2010 |

(Continued)

OTHER PUBLICATIONS

Cecchetto et al., "Study of a Li-air battery having an electrolyte solution formed by a mixture of an ether-based aprotic solvent and an ionic liquid", Journal of Power Sources, 213, 2012, pp. 233-238.

(Continued)

*Primary Examiner* — Amanda C. Walke
(74) *Attorney, Agent, or Firm* — Cantor Colburn LLP

(57) ABSTRACT

An electrolyte for a lithium metal battery, the electrolyte including: a solvated ionic liquid including a glyme solvent and a lithium salt, wherein an amount of the lithium salt is about 3 moles per liter or greater, and wherein a lithium metal battery including the electrolyte has an initial solution resistance of less than about 1 ohm and a bulk resistance of less than about 10 ohms. A lithium metal battery includes: a negative electrode including a lithium metal or a lithium metal alloy; a positive electrode; and the electrolyte. A method of manufacturing the lithium metal battery includes: mixing a glyme solvent and a lithium salt to obtain an electrolyte precursor; disposing the electrolyte precursor into the lithium metal battery; and performing hermetic immersion of the electrolyte precursor in the lithium metal battery to form the electrolyte.

29 Claims, 17 Drawing Sheets

(51) Int. Cl.
    *H01M 10/0525*     (2010.01)
    *H01M 10/0567*     (2010.01)
    *H01M 10/0569*     (2010.01)
    *H01M 10/058*     (2010.01)
    *H01M 4/134*     (2010.01)
    *H01M 10/052*     (2010.01)
    *H01M 4/38*     (2006.01)
    *H01M 4/40*     (2006.01)

(52) U.S. Cl.
    CPC ..... *H01M 10/058* (2013.01); *H01M 10/0525* (2013.01); *H01M 10/0567* (2013.01); *H01M 10/0569* (2013.01); *H01M 4/382* (2013.01); *H01M 4/40* (2013.01)

(58) Field of Classification Search
    CPC ......... H01M 10/0525; H01M 10/0567; H01M 10/0569; H01M 10/0565
    USPC ....................................................... 429/341
    See application file for complete search history.

(56) References Cited

U.S. PATENT DOCUMENTS

| | | | | |
|---|---|---|---|---|
| 2012/0141878 | A1* | 6/2012 | Ohashi | H01M 10/0567 429/300 |
| 2013/0093398 | A1* | 4/2013 | Takabayashi | H01M 2/021 320/128 |
| 2014/0011101 | A1* | 1/2014 | Ma | H01M 12/08 429/405 |
| 2014/0045076 | A1* | 2/2014 | Shishikura | H01M 10/0567 429/330 |
| 2014/0072880 | A1* | 3/2014 | Cheong | H01M 10/0565 429/303 |
| 2014/0090780 | A1* | 4/2014 | Jeong | H01M 10/04 156/274.4 |
| 2015/0147627 | A1* | 5/2015 | Takano | H01M 2/1686 429/144 |
| 2016/0181658 | A1* | 6/2016 | Kim | H01M 10/052 429/200 |
| 2016/0204471 | A1* | 7/2016 | Nakamoto | H01M 10/052 429/200 |
| 2016/0336618 | A1* | 11/2016 | Lee | H01M 10/0565 |
| 2016/0344063 | A1* | 11/2016 | Chang | H01M 10/0569 |
| 2017/0229737 | A1* | 8/2017 | Seo | H01M 10/0568 |

FOREIGN PATENT DOCUMENTS

| | | |
|---|---|---|
| JP | 2013084562 A | 5/2013 |
| JP | 2013161608 A | 8/2013 |
| KR | 20160136686 A | 11/2016 |

OTHER PUBLICATIONS

Qian et al., "High rate and sable cycling of lithium metal anode", Nature Communications, 2015, pp. 1-9.

* cited by examiner

ELECTROLYTE FOR LITHIUM METAL BATTERY, LITHIUM METAL BATTERY INCLUDING THE ELECTROLYTE, AND METHOD OF MANUFACTURING THE LITHIUM METAL BATTERY

CROSS-REFERENCE TO RELATED APPLICATION

This application claims the benefit of and priority to Korean Patent Application No. 10-2016-0065693, filed on May 27, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to an electrolyte for a lithium metal battery using a lithium negative electrode, a lithium metal battery using the electrolyte, and a method of manufacturing the lithium metal battery.

2. Description of the Related Art

As the electrical, electronic, telecommunication, and computer industries have rapidly developed, demand for secondary batteries having improved performance and improved safety have recently rapidly increased. Particularly, along with the trends towards lighter, slimmer, and more compact electrical and electronic products with improved portability, there has been a demand for lighter and smaller secondary batteries as core components thereof. Further, along with the concern about environmental pollution problems, such as air pollution and noise pollution from the widespread of an increasing number of automobiles, and the rise of a need for new energy sources to offset the depletion of fossil fuels, there has been an increasing need for the development of electric vehicles as a solution of such problems, and batteries with improved power output and improved energy density as power sources of electric vehicles. Recently, lithium metal batteries have received significant attention as a new advanced high-performance next generation battery. Lithium, which is available as a negative electrode material having a low density and a low standard reduction potential, may be used as an electrode material for high-energy density batteries.

Nonetheless, there remains a need for improved battery materials.

SUMMARY

Provided is an electrolyte for a lithium metal battery including a lithium negative electrode having improved stability at high voltage.

Provided is a lithium metal battery with improved cell performance, the lithium metal battery including the electrolyte.

Provided is a method of manufacturing the lithium metal battery.

Additional aspects will be set forth in part in the description which follows and, in part, will be apparent from the description.

According to an aspect of an embodiment, an electrolyte for a lithium metal battery includes: a solvated ionic liquid including a glyme solvent and a lithium salt, wherein an amount of the lithium salt is about 3 moles per liter or greater, and wherein a lithium metal battery including the electrolyte has an initial solution resistance of less than about 1 ohm and a bulk resistance of less than about 10 ohms.

According to an aspect of another embodiment, a lithium metal battery includes: a lithium negative electrode comprising a lithium metal or a lithium metal alloy; a positive electrode; and the electrolyte between the lithium negative electrode and the positive electrode.

According to an aspect of another embodiment, a method of manufacturing the lithium metal battery includes: mixing a glyme solvent and a lithium salt to obtain an electrolyte precursor; disposing the electrolyte precursor into the lithium metal battery; and performing hermetic immersion of the electrolyte in the lithium metal battery to manufacture the lithium metal battery.

In an embodiment, the hermetic immersion may be performed at about 60° C. or less.

In an embodiment, the hermetic immersion is performed for about 10 hours or less.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
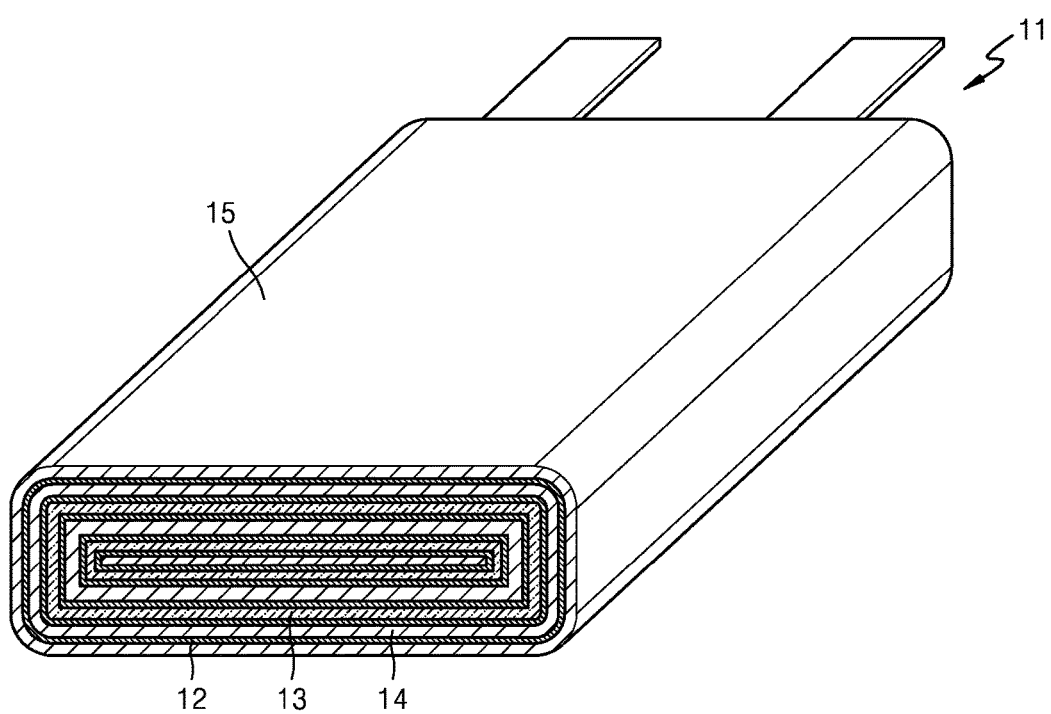
FIG. 1 is a schematic view illustrating a structure of a lithium metal battery according to an embodiment.

Reference will now be made in detail to embodiments of an electrolyte for a lithium battery, a lithium metal battery including the electrolyte, and a method of manufacturing the lithium metal battery, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "substituted" as used herein means substitution with a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_2$-$C_{20}$ alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "alkyl" used herein refers to a fully saturated branched or unbranched (straight chain or linear) hydrocarbon group. Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

The terms "alkoxy" and "aryloxy" respectively mean alkyl or aryl bound to an oxygen atom.

The term "alkenyl" as used herein refers to a branched or unbranched hydrocarbon group having at least one carbon-carbon double bond. Non-limiting examples of the alkenyl group include vinyl, allyl, butenyl, isopropenyl, and isobutenyl.

The term "alkynyl" as used herein refers to a branched or unbranched hydrocarbon group having at least one carbon-carbon triple bond. Non-limiting examples of the alkynyl group include ethynyl, butynyl, isobutynyl, and isopropynyl.

The term "aryl" as used herein also includes a group with an aromatic ring fused to at least one carbocyclic group. Non-limiting examples of the aryl group include phenyl, naphthyl, and tetrahydronaphthyl.

The term "heteroaryl" as used herein indicates a monocyclic or bicyclic organic compound including at least one heteroatom selected from N, O, P, and S, wherein the rest of the cyclic atoms are all carbon. The heteroaryl group may include, for example, one to five heteroatoms and may include five- to ten-membered rings. In the heteroaryl group, S or N may be present in various oxidized forms.

Non-limiting examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl group, an oxazol-5-yl group, an isoxazol-3-yl group, an isoxazol-4-yl group, an isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "carbocyclic" as used herein refers to saturated or partially unsaturated non-aromatic monocyclic, bicyclic or tricyclic hydrocarbon groups. Non-limiting examples of the monocyclic hydrocarbon groups include cyclopentyl, cyclopentenyl, cyclohexyl, and cyclohexenyl. Non-limiting examples of the bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl. The tricyclic hydrocarbon groups may be, for example, adamantyl and the like.

The term "heterocyclic" as used herein refers to a cyclic hydrocarbon group having at least one heteroatom and 5 to 20 carbon atoms, for example, 5 to 10 carbon atoms. In this regard, the heteroatom may be one selected from sulfur, nitrogen, oxygen, and boron.

The term "C-rate" is a measure of the rate at which a battery is charged or discharged relative to its maximum capacity, A 1 C rate, or a constant current of 1 C, means that the charge/discharge current will charge/discharge the entire battery in 1 hour.

According to an aspect of the present disclosure, an electrolyte for a lithium metal battery includes: a solvated ionic liquid (SIL) including a glyme solvent; and a lithium salt, wherein the amount of the lithium salt is about 3 moles per liter (M) or greater, and wherein a lithium metal battery including the electrolyte has an initial solution resistance of about less than 1 ohm (Ω) and a bulk resistance of about less than 10Ω. As used herein, the term "solution resistance" refers to a standard impedance value in a region of a Nyquist plot where a solution resistance component appears for a lithium metal battery. As used herein, the term "initial solution resistance" refers to a standard impedance value in a region of a Nyquist plot where a solution resistance component appears for a lithium metal battery (e.g., a coin cell) at an initial stage, that is before the formation process. Also, the term "solution resistance" refers to a standard impedance value in a region of a Nyquist plot where a solution resistance component appears for a lithium metal battery after the formation process. Here, the formation process has the same meaning as 1st charge-discharge cycle. The solution resistance was also measured before and after the formation process (1st charge-discharge cycle) of a lithium metal battery (pouch cell). The solution resistance was obtained from impedance characteristics after one cycle (see Evaluation Example 4).

While not wanting to be bound by theory, the term "bulk resistance" is understood to refer to a resistance value which indicates the ease of diffusion in an electrode.

The initial solution resistance, solution resistance, and bulk resistance of a lithium metal battery may be determined by resistance measurement according to a 2-probe method with an impedance analyzer (Solartron 1260A Impedance/Gain-Phase Analyzer) at about 25° C. in a frequency range of about $10^6$ hertz (Hz) to 0.1 Hz at a voltage bias of about 10 millivolts mV.

The bulk resistance may be determined from the results of an impedance measurement performed in 24 hours from the manufacture of a lithium metal battery and may be determined using a Nyquist plot, wherein the bulk resistance may be determined based on the position and size of a semicircle in the Nyquist plot, and wherein the bulk resistance may be determined as a difference between the left x-intercept and the right x-intercept of the semicircle.

As is further disclosed below, the initial solution resistance and bulk resistance of coin cell lithium metal batteries were measured before and after a formation process, i.e., initial cycles after manufacture. The solution resistance was also measured before and after the formation process of a pouch cell lithium metal battery pouch cell. The coin cell lithium metal battery may be, for example, a coin cell lithium metal battery manufactured according to Example 1, as is further disclosed below. The pouch cell lithium metal battery may be, for example, a pouch cell lithium metal battery manufactured according to Example 2. The conditions for the formation process of the lithium metal battery may be the same as described in the exemplary examples which are further disclosed below.

The formation process may be performed under the following conditions. For example, a lithium metal battery may be charged at about 25° C. with a constant current of 0.1 C (C– rate) to a voltage of about 4.30 Volts (V) with respect to Li, and then charged at a constant voltage of 4.30 V until a cutoff current of 0.05 C, and then be discharged with a constant current of 0.1 C to a voltage of about 2.8 V with respect to Li to provide the first cycle of the formation process. This charging and discharging process may be performed further twice to complete the formation process.

In an embodiment, the lithium metal battery may have a solution resistance of about 1Ω or less, for example, about 0.001Ω to about 0.99Ω, about 0.01Ω to about 0.95Ω, or about 0.1Ω to about 0.9Ω.

In an embodiment, a lithium metal battery including the electrolyte may have an initial solution resistance of, for example, about 0.001Ω to about 0.99Ω, about 0.01Ω to about 0.95Ω, or about 0.1Ω to about 0.9Ω, and a bulk resistance of about 10Ω or less, for example, about 0.001Ω to about 9.9Ω, about 0.01Ω to about 9Ω, or about 0.1Ω to about 1Ω.

The solvated ionic liquid (SIL) comprises an ionic complex comprising a cation, such as a lithium cation, for example [Li(glyme)]$^+$, and an anion, for example bis(fluorosulfonyl) imide anion (FSI$^-$). According to an embodiment, the cation [Li(glyme)]$^+$ is obtained from the glyme solvent, wherein the lithium is from the lithium salt, and the (fluorosulfonyl) imide anion (FSI$^-$) is obtained from the anion of the lithium salt. In the ionic complex, unshared electron pairs of oxygen (O) in the glyme solvent may form coordinate bonds with the lithium (Li) of the lithium salt. Without being bound by theory, using an electrolyte including a SIL as described herein may increase an onset potential as observed by linear sweep voltammetry (LSV) when compared to an onset potential for a blend of the lithium salt and the glyme solvent. The electrolyte may have improved electrochemical stability, improved responsiveness to a high voltage, and improved stability to a high voltage.

The complex may be obtained by a method of manufacturing a lithium metal battery, according to an embodiment, and by an electrolyte injection process of the lithium metal battery manufacturing method, as is further described below. In an embodiment, the glyme solvent may comprise a compound having a boiling point of about 90° C. or less, for example, about 25° C. to about 90° C., about 30° C. to about 85° C., or about 35° C. to about 80° C. A solubility at 25° C. of the lithium salt in the glyme solvent may be, for example, about 5 molar (M) or more, and in some embodiments, about 5 M to about 9.6 M, about 5.5 M to about 9 M, or about 6 M to about 8.5 M. When the glyme solvent has a boiling point of about 90° C. or less, it may be easy to remove the glyme solvent during a hermetic immersion process, for instance a hermetic immersion process, following injection of a low-viscosity component of the electrolyte to obtain an electrolyte having a high-viscosity.

In an embodiment, the amount of the SIL may be about 100 parts by volume or greater, and in some embodiments, about 200 parts to about 1000 parts by weight, about 250 parts to about 900 parts by weight, or about 300 parts to about 800 parts by weight, based on 100 parts by volume of an unsolvated glyme solvent comprised in the electrolyte. As used herein, the term "unsolvated glyme solvent" refers to a portion of the glyme solvent that does not form a coordination complex with the lithium salt of the glyme solvent in the electrolyte.

The lithium metal battery comprises the electrolyte, a positive electrode, and a negative electrode including a lithium metal or a lithium metal alloy.

When a graphite negative electrode is used as a negative electrode of a lithium secondary battery and a solid electrolyte interphase (SEI) is formed on a surface of the negative electrode, interfacial characteristics of the negative electrode may not change. Without being bound by theory, solvation of a lithium salt by a solvent in a lithium secondary battery including such a graphite negative electrode may cause a structural breakdown of the graphite or other soft carbon due to the enlarged structure of the solvated lithium salt, thus resulting in byproducts on the surface of the SEI of the graphite negative electrode.

On the other hand, in a lithium metal battery using a lithium negative electrode, due to continuously newly grown interfaces on a surface of the lithium negative electrode through, for example, deposition of lithium on the surface during charging and discharging, the interfacial characteristics of the lithium negative electrode may be changed. In particular, and without being bound by theory, a graphite negative electrode with an SEI thereon may have continuously stable surface characteristics, whereas a lithium negative electrode based on the mechanism of lithium deposition/dissolution on a surface of the lithium negative electrode, and not on the mechanism of ionic deintercalation/intercalation, may be unstable even with a SEI thereon during a discharging process during which dissolution of lithium metal ions may occur. Accordingly, repeated discharging processes may cause depletion of the electrolyte and consequently reduce the lifetime of the lithium metal battery.

To address these drawbacks, including a high-voltage additive or a co-solvent that may stable to a high voltage in an electrolyte for a lithium metal battery has been suggested. While not wanting to be bound by theory, it is understood that this method may prevent electrochemical oxidation of a primary solvent in the lithium metal battery that may occur at a high voltage, but may not provide suitable lithium deposition density for a lithium metal battery having a high energy density. Without being bound by theory, using a high-voltage additive may contribute to a viscosity reduction of the electrolyte, but may lead to a low deposition density, due to a lack of ion conducting characteristics, and the low deposition density may be insufficient to provide suitable energy density from the reduction of lithium ions on the surface of the negative electrode during charging.

To address these and other drawbacks, provided is a lithium metal battery including a high-concentration electrolyte that contains a SIL. A high-concentration electrolyte including an SIL as described herein may be prepared by mixing a lithium salt and a glyme solvent. The glyme solvent may provide improved solubility to the lithium salt to obtain an electrolyte precursor having a low concentration of the lithium salt. The electrolyte precursor may be subsequently disposed in, e.g., inserted in, and then sealed within the lithium metal battery to form the electrolyte. In an embodiment, the electrolyte precursor is injected into the lithium metal battery. In an embodiment, the hermetic immersion process may remove a portion of the glyme solvent from the electrolyte, thereby forming a high-concentration electrolyte. Without being bound by theory, using the high-concentration electrolyte, unlike when using an electrolyte containing a co-solvent, a lithium deposition layer on the lithium negative electrode may have improved deposition density, and a lithium metal battery with improved lifetime characteristics may be obtained.

Any suitable method for the hermetic immersion of the electrolyte precursor in the lithium metal battery may be used, including but limited to hermetic immersion. The hermetic immersion may be performed at a temperature of about 60° C. or less, for example, about 20° C. to about 60° C., about 30° C. to about 60° C., or about 35° C. to about 55° C. The hermetic immersion may be performed for about 10 hours or less, for example, about 1 hour to about 6 hours, about 2 hours to about 6 hours, or about 3 hours to about 5 hours. When the hermetic immersion is performed within these temperatures and time ranges, free solvent molecules, e.g., unsolvated glyme solvent, that may be unfavorable under high voltage conditions may be removed through vaporization.

Therefore, without a chemical change in the electrolyte, such as decomposition of the lithium salt, a lithium metal battery with improved ion conductivity and lifetime characteristics may be obtained.

In an embodiment, the conditions for the hermetic immersion may be appropriately controlled to obtain an electrolyte that has a lithium salt concentration of about 3 M or more, in some embodiments, about 3 M to about 7.5 M, and in some other embodiments, about 3 M to about 5 M, and in still other embodiments, about 3 M to about 4.5 M.

In an embodiment, the amount of the glyme solvent remaining after the hermetic immersion may be less than about 40 volume percent (vol %), for example, about 1 vol % to about 35 vol %, about 10 vol % to about 30 vol %, or about 15 vol % to about 25 vol %, with respect to a total initial volume of the glyme solvent injected into the lithium metal battery.

Without being bound by theory, using a low-concentration electrolyte precursor as described above may facilitate the injection and immersion of the electrolyte into an electrode without sacrificing high-voltage responsiveness, due to a low electrolyte viscosity, and furthermore, may facilitate inclusion, e.g., absorption, of the electrolyte into a high-density electrode (for example, a high-density positive electrode). In an embodiment, an electrolyte according to an embodiment may increase the deposition density of a lithium deposition layer due to a greater proportion of the glyme solvent used as an ion conductive solvent, compared to other electrolytes, and improve the energy density and lifetime characteristics of a lithium metal battery including the electrolyte.

When injecting a high-concentration electrolyte into a lithium metal battery, there is a limitation in absorption of the electrolyte in an electrode due to a high viscosity of the high-concentration electrolyte. The high viscosity of the electrolyte may act like resistance during charging and discharging, adversely affecting the lifetime of the lithium metal battery.

According to an embodiment, in a method of manufacturing a lithium metal battery, a low-concentration electrolyte as described above may be injected into the lithium metal battery so that absorption of the electrolyte into an electrode, and into a high-density electrode, may be improved. Unsolvated glyme solvent, which would otherwise be liable to oxidative decomposition at high voltage, would remain unreacted, and not form a complex with a cation of the added lithium salt, may be removed by vaporization, thus reducing a concentration deviation of the electrolyte in the lithium metal battery. Consequentially, the lithium metal battery may have improved stability at high voltage.

The vaporization of the unsolvated glyme solvent may be performed under vacuum conditions at a temperature greater than an evaporation temperature of the glyme solvent. Through this process, the unsolvated glyme solvent molecules that remain and do not form a complex may be vaporized, so that the lithium cations of the lithium salt may form a cation complex with the glyme solvent. Consequentially, the electrolyte may include the SIL including the cation complex and anion of the lithium salt. For example, the anion may be the anion $((FSO_2)_2N^-)$ of the imide-based lithium salt $(Li(FSO_2)_2N)$. When the electrolyte has such a composition, the electrolyte may have a lower vapor pressure, compared to when the glyme solvent is present as an unsolvated glyme solvent, and have improved high-temperature characteristics. In addition, decomposition of the glyme solvent at an increased voltage may also be inhibited. When using an electrolyte according to an embodiment, the electrochemical stability of the lithium metal battery may be improved without using a non-functional solvent, e.g., a high-voltage additive that does not have ion conductivity.

In an embodiment, the glyme solvent and a lithium salt are mixed to obtain an electrolyte precursor. The electrolyte precursor may be disposed into the lithium metal battery and the battery subsequently sealed to form the electrolyte. In an embodiment the electrolyte precursor has a viscosity of about 1 centipoise (cP) to about 3 cP, about 1.1 cP to about 2.8 cP, or about 1.2 cP to about 2.6 cP at 25° C.

A lithium metal battery including an electrolyte according to an embodiment may have a solution resistance after one charge/discharge cycle of about 1 ohm (Ω) or less, for example, about 0.001Ω to about 0.99Ω, about 0.01Ω to about 0.95Ω, or about 0.1Ω to about 0.9Ω. The lithium metal battery may be of a pouch cell type. For example, the electrolyte may have an ion conductivity at 25° C. of about 2.3 millisiemens per centimeter (mS/cm) to about 5.5 mS/cm, and in an embodiment, about 2.3 mS/cm to about 3.9 mS/cm, or about 4.5 mS/cm to about 5.5 mS/cm.

In an embodiment, the electrolyte may comprise, e.g., consist essentially of, the SIL including the glyme solvent and the lithium salt.

In an embodiment, the amount of the lithium salt in the electrolyte for a lithium metal battery may be about 3 M or greater, for example, about 3 M to about 5 M, or about 3.5 M to about 4.5 M.

For example, the glyme-based solvent may comprise at least one selected from ethylene glycol dimethyl ether (i.e., 1,2-dimethoxyethane), ethylene glycol diethyl ether (i.e., 1,2-diethoxyethane), propylene glycol dimethyl ether, propylene glycol diethyl ether, butylene glycol dimethyl ether, butylene glycol diethyl ether, diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, dipropylene glycol dimethyl ether, tripropylene glycol dimethyl ether, tetrapropylene glycol dimethyl ether, dipropylene glycol diethyl ether, tripropylene glycol diethyl ether, tetrapropylene glycol diethyl ether, dibutylene glycol dimethyl ether, tributylene glycol dimethyl ether, tetrabutylene glycol dimethyl ether, dibutylene glycol diethyl ether, tributylene glycol diethyl ether, and tetrabutyleneglycol diethylether.

In an embodiment, the lithium salt may be any suitable material for preparing an electrolyte. For example, the lithium salt may comprise at least one selected from among LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiSbF$_6$, LiN(SO$_2$CF$_3$)$_2$, Li(FSO$_2$)$_2$N, LiC$_4$F$_9$SO$_3$, LiN(SO$_2$CF$_2$CF$_3$)$_2$, LiSbF$_6$, LiPF$_3$(CF$_2$CF$_3$)$_3$, LiPF$_3$(C$_2$F$_5$)$_3$, LiPF$_3$(CF$_3$)$_3$, LiCl, LiF, LiBr, LiI, LiB(C$_2$O$_4$)$_2$, lithium difluoro(oxalato)borate (LiFOB), lithium bis(oxalato)borate (LiBOB), and LiN(CF$_2$SO$_2$)(CF$_3$CF$_2$CF$_2$SO$_2$).

In an embodiment, the lithium salt may comprise a fluorine containing sulfone-based compound. For example, the lithium salt may comprise a fluorine-containing sulfonyl imide-based compound, including but not limited to at least one selected from LiN(FSO$_2$)$_2$ (LiFSI), LiN(CF$_3$SO$_2$)$_2$ (LiTFSI), LiN(CF$_2$SO$_2$)(CF$_3$CF$_2$CF$_2$SO$_2$), or LiN(CF$_3$CF$_2$SO$_2$)$_2$.

For example, the lithium salt may be Li(FSO$_2$)$_2$N. When the lithium salt is Li(FSO$_2$)$_2$N, the electrolyte may have improved characteristics, for example, increased ion conductivity, compared with when Li(CF$_3$SO$_2$)$_2$N is used as the lithium salt. Without being bound by theory, the improved characteristics are attributed to Li(CF$_3$SO$_2$)$_2$N having more fluorine atoms, and thus has a greater electronegativity present next to the lithium of the lithium salt, compared with Li(FSO$_2$)$_2$N, and the fluorine atoms may inhibit coordination bonding between the lithium of the lithium salt and oxygen of the glyme solvent such as 1,2-dimethoxyethane (DME). For example, Li(CF$_3$SO$_2$)$_2$N (LiTFSI) includes fluorine atoms of the electron-withdrawing trifluoromethyl group, as compared with Li(FSO$_2$)$_2$N, and the fluorine atoms may inhibit the binding between oxygen of the glyme solvent and Li ions, which may result in formation of a carbon complex, and precipitation of LiTFSI as a salt.

In an embodiment, in Raman spectra of the electrolyte, an intensity ratio of a first peak A at a Raman shift of about 820 inverse centimeters (cm$^{-1}$) to about 850 cm$^{-1}$ to a second peak B at a Raman shift of about 860 cm$^{-1}$ to about 880 cm$^{-1}$ may be about 0.1 or greater, and in an embodiment, about 0.1 to about 0.3, about 0.2 to about 0.28, or about 0.25 to about 0.3.

In the Raman spectra of the electrolyte, the peaks A at a Raman shift of about 820 cm$^{-1}$ to about 850 cm$^{-1}$ originate from the C—O stretching and the CH$_3$ rocking vibration modes of free 1,2-dimethoxyethane (e.g., unsolvated glyme solvent or DME), and the peaks B at a Raman shift of about 860 cm$^{-1}$ to about 880 cm$^{-1}$ originate from the Li—O breathing vibration mode of the glyme solvent, DME in the SIL. The intensity ratio of the peak A to the peak B may correspond to a ratio of the unsolvated glyme solvent and the glyme solvent in the SIL.

In an embodiment, the electrolyte may have a weight loss ratio of about 15% or less at about 150° C. to about 200° C., and in another embodiment, about 10 to about 15% at about 150° C. to about 200° C., as measured by thermogravimetric analysis (TGA). Without being bound by theory, when using the electrolyte having such weight loss characteristics, a lithium metal battery may have improved high-temperature characteristics and lifetime characteristics, compared to a lithium metal battery including an electrolyte having a weight loss ratio of greater than about 15%.

In an embodiment, the electrolyte has a region with a constant current in a voltage range of about 3 volts (V) to about 4.6 V, and a decomposition onset potential of about 4.8 V or greater, when analyzed by linear sweep voltammetry (LSV). The LSV may be performed in a voltage range of about 3 V to 7 V at a scan rate of about 1 millivolts per second (mV/s) to 5 mV/s, and in an embodiment, about 5 mV/s. In an embodiment, the LSV may be performed using a platinum electrode as a working electrode, and lithium metal as a reference electrode and counter electrode.

In an embodiment, the lithium salt of the electrolyte may comprise Li(FSO$_2$)$_2$N, and the glyme-based solvent may comprise at least one selected from ethylene glycol dimethyl ether (1,2-dimethoxyethane, DME) and ethylene glycol diethylether (1,2-diethoxyethane).

In an embodiment, the electrolyte may be in a liquid state.

In an embodiment, the electrolyte may further include a lithium ion conductive polymer. The electrolyte may be of a gel or solid type. For example, the lithium ion conductive polymer may comprise at least one selected from a polyethylene oxide, a polyvinyl alcohol, a polyvinylpyrrolidone, a polyethylene glycol diacrylate, and polyethylene glycol dimethacrylate.

In an embodiment, the electrolyte may have a viscosity at 25° C. of about 2.5 cP or greater, for example about 2.5 cP to about 5 cP, for example about 2.5 cP to about 4 cP. Without being bound by theory, when the electrolyte has a viscosity within these ranges, the electrolyte may allow free migration of ions and have improved ion conductivity. The electrolyte may also have improved oxidation resistance and high-voltage stability. Accordingly, a lithium metal battery with facilitated initial impregnation of the electrode by the electrolyte may be obtained. The improvement in high-voltage stability may be identified by LSV, and the facilitated initial impregnation of the electrode may be identified by evaluating impedance characteristics.

In an embodiment, the electrolyte may have an ion conductivity at 25° C. of about 2.3 mS/cm to about 5.5 mS/cm, about 2.5 mS/cm to about 5.1 mS/cm, or about 2.7 mS/cm to about 4.5 mS/cm.

In an embodiment, a lithium deposition layer on an upper surface of the lithium negative electrode may have a lithium deposition density of about 0.2 grams per milliliter (g/cc) to about 0.53 g/cc, about 0.25 g/cc to about 0.5 g/cc, or about 0.3 g/cc to about 0.47 g/cc. In an embodiment, the lithium metal battery may have a capacity retention of about 85% or greater, and in another embodiment, about 85 to about 99%, after 100 cycles of charging and discharging.

In an embodiments, the electrolyte may further include at least one selected from among ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, dibutyl carbonate, γ-butyrolactone, diethylene glycol dimethyl ether, dipropylene glycol dimethyl ether, trimethylene glycol dimethyl ether, tetraethylene glycol dimethyl ether, polyethylene glycol dimethyl ether, succinonitrile, dimethyl sulfone, ethylmethyl sulfone, diethyl sulfone, adiponitrile, 1,1,2,2-tetrafluoroethyl 2,2,3,3-tetrafluoropropyl ether, 2,2,3,3,4,4,5,5-octafluoropentyl 1,1,2,2-tetrafluoroethyl ether, benzonitrile, acetonitrile, tetrahydrofuran, 2-methyltetrahydrofuran, dioxolane, 4-methyl dioxolane, N,N-dimethylformamide, N,N-dimethylacetamide, dimethyl sulfoxide, dioxane, sulfolane, dichloroethane, chlorobenzene, and nitrobenzene.

To improve charge-discharge characteristics and resistance to flame, the electrolyte may further include at least one selected from pyridine, triethylphosphate, triethanolamine, a cyclic ether, ethylene diamine, n-glyme, hexamethyl phosphoramide, a nitrobenzene derivative, sulfur, a quinone imine dye, an N-substituted oxazolidinone, an N,N-substituted imidazolidine, ethylene glycol dialkyl ether, an ammonium salt, pyrrole, 2-methoxyethanol, and aluminum trichloride. In an embodiment, to provide nonflammable characteristics, a halogenated solvent such as carbon tetrachloride, ethylene trifluoride, or the like may be further added to the electrolyte, if desired.

In an embodiment, an organic solvent of the electrolyte may include a low-boiling point solvent. A low-boiling point solvent may refer to a solvent having a boiling point of about 200° C. or less at 25° C. and 1 atm.

In an embodiment, the organic solvent may include at least one selected from dialkyl carbonate, a cyclic carbonate, a linear or cyclic ester, a linear or cyclic amide, an aliphatic nitrile, a linear or cyclic ether, and a derivative thereof. For example, the organic solvent may include at least one selected from dimethyl carbonate (DMC), ethylmethyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile, dimethyl sulfoxide, dimethyl formamide, dimethyl acetamide, γ-valerolactone, γ-butyrolactone, and tetrahydrofuran. However, the organic solvent is not limited thereto. Any suitable low-boiling point solvent, including those available in the art, may be used.

The types of the lithium metal battery are not specifically limited, and may include a lithium secondary battery, such as a lithium ion battery, a lithium ion polymer battery, and a lithium sulfur battery, and a lithium primary battery.

The lithium negative electrode may comprise a lithium metal or a lithium alloy electrode.

For example, the lithium alloy may include lithium and a metal and/or metalloid alloyable with lithium. For example, the metal and/or metalloid alloyable with lithium may comprise at least one selected from Si, Sn, Al, Ge, Pb, Bi, Sb, a Si—Z alloy (wherein Z may be an alkaline metal, an alkaline earth metal, a Group 13 element, a Group 14 element, a transition metal, and a rare earth element, except for Si), or a Sn—X alloy (wherein X may comprise at least one selected from an alkaline metal, an alkaline earth metal, a Group 13 element, a Group 14 element, a transition metal, and a rare earth element, except for Sn). The variables X and Z may each be, independently, at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, and Po.

The lithium metal battery may have improved stability at a high voltage of about 4.35 V or greater, for example, about 4.4 V to about 4.5 V.

In an embodiment, the lithium metal battery may include a lithium deposition layer having a jelly bean-like morphology and a thickness of about 10 micrometers (µm) to 30 µm, for example, about 20 µm, formed on a surface of the lithium negative electrode after about 20 cycles to about 30 cycles of charging and discharging at about 0.5 C and about 3 V to about 4.4 V.

For example, a lithium metal battery according to an embodiment may be manufactured in the following manner.

First, a positive electrode may be prepared.

For example, a positive active material, a conducting agent, a binder, and a solvent may be mixed together to prepare a positive active material composition. The positive active material composition may be directly coated on a metallic current collector to prepare a positive electrode. In another embodiment, the positive active material composition may be cast on a separate support to form a positive active material film. The positive active material film may then be separated from the support and laminated on a metallic current collector, to thereby prepare a positive electrode. In an embodiment, the positive electrode may be any of a variety of types, not limited to these examples.

In an embodiment, the positive active material may comprise a lithium composite oxide. Any suitable lithium composite oxide, including those available in the art, may be used without limitation. For example, the lithium composite oxide may comprise at least one of a composite oxide of lithium with a metal comprising at least one selected from cobalt, manganese, and nickel. In an embodiment, the lithium composite oxide may comprise a compound represented by one of the following formulae: $Li_aA_{1-b}B'_bD_2$ (wherein $0.90 \leq a \leq 1.8$ and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as the lithium composite oxide may have a surface coating layer (hereinafter, also referred to as "coating layer"). Alternatively, a mixture of a compound without a coating layer and a compound having a coating layer, the compounds being selected from the compounds listed above, may be used. In an embodiment, the coating layer may include at least one compound of a coating element selected from oxide, hydroxide, oxyhydroxide, oxycarbonate, and hydroxyl carbonate of the coating element. In an embodiment, the compounds for forming the coating layer may be amorphous or crystalline. In an embodiment, the coating element for forming the coating layer may comprise at least one selected from magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), and zirconium (Zr). In an embodiment, the coating layer may be formed using any suitable method that does not adversely affect the physical characteristics of the positive active material when a compound of the coating element is used. For example, the coating layer may be formed using spray coating or dipping. Additional details of the coating may be determined by one of skill in the art without undue experimentation, and thus additional details are omitted for clarity.

To obtain a high-density lithium metal battery, a high-density positive electrode may be used. The high-density positive electrode may be prepared using, for example, $LiCoO_2$.

Non-limiting examples of the conducting agent may include: at least one selected from carbon black; graphite particle; natural graphite; artificial graphite; acetylene black; Ketjen black; carbon fiber; carbon nanotube; metal powder, metal fiber or metal tube of copper, nickel, aluminum, and silver; and a conductive polymer such as polyphenylene derivative. However, embodiments are not limited thereto. Any suitable conducting agents, including those available, in the art may be used.

Non-limiting examples of the binder may include at least one selected from vinylidene fluoride/hexafluoropropylene copolymers, a polyvinylidene fluoride, a polyimide, a polyethylene, a polyester, a polyacrylonitrile, a polymethyl methacrylate, a polytetrafluoroethylene (PTFE), carboxymethyl cellulose/styrene-butadiene rubber (SMC/SBR) copolymers, and a styrene butadiene rubber-based polymer. However, embodiments are not limited thereto. Any suitable binder, including those available in the art, may be used.

For example, the solvent may comprise N-methyl-pyrrolidone, acetone, or water. However, examples of the solvent are not limited thereto. Any suitable material available as a solvent, including those available in the art, may be used.

The amounts of the positive active material, the conducting agent, the binder, and the solvent may be the same as those levels that are suitable for use in lithium metal batteries. At least one of the conducting agent, the binder, and the solvent may be omitted depending on the use and the structure of the lithium metal battery.

A lithium metal or a lithium alloy thin film may be prepared as a lithium negative electrode.

A separator to be disposed between the positive electrode and the lithium negative electrode may be prepared.

The separator may be an insulating thin film having a high ion permeability and a high mechanical strength. The separator may have a pore diameter of about 0.01 μm to about 10 μm, and a thickness of about 5 μm to about 20 μm. Non-limiting examples of the separator are olefin-based polymers, such as polypropylene, and sheets or non-woven fabric made of a glass fiber or polyethylene. When the electrolyte of the lithium metal battery is a solid polymer electrolyte, the solid polymer electrolyte may also serve as the separator.

For example, the separator may comprise a single-layer structure or a multi-layer structure including at least two layers of at least one selected from polyethylene, polypropylene, and a polyvinylidene fluoride. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene.

Figure 2:
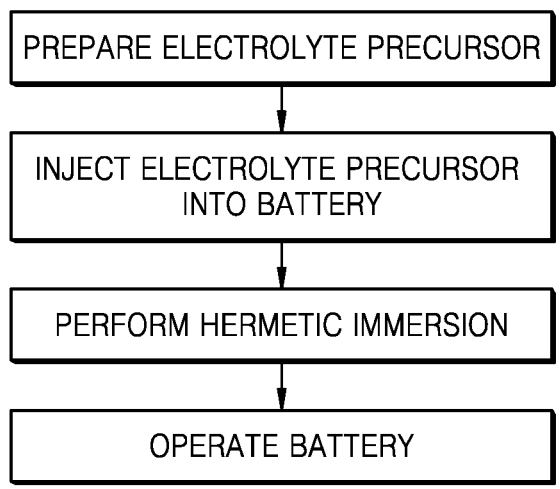
FIG. 2 is a flowchart illustrating a method of manufacturing and operating a lithium metal battery, according to an embodiment.

A method of manufacturing a lithium metal battery, according to an embodiment, now will be described with reference to FIG. 2. Referring to FIG. 2, according to an embodiment, a method of manufacturing a lithium metal battery may include an electrolyte injection process. First, a glyme solvent and a lithium salt may be combined to prepare an electrolyte precursor. In the preparing of the electrolyte precursor, when lithium bis(fluorosulfonyl)imide (LiFSI) is used as the lithium salt, $[Li(glyme)]^+$ cations and $FSI^-$ anions may form a complex in a solvated ionic liquid (SIL). The SIL may improve the stability of the electrolyte, compared to when a blend of lithium and the electrolyte precursor is included. As used herein, the abbreviation "glyme" denotes a glyme-based solvent such as 1,2-dimethoxyethane (DME), and "FSI" denotes bis(fluorosulfonyl)imide.

In an embodiment, the electrolyte precursor may include a low concentration of the lithium salt, for example, about 2.5 M or less, and in another embodiment, about 0.8 M to about 2 M, about 0.9 M to about 1.9 M, or about 1 M to about 1.8 M. The electrolyte precursor including a low concentration of lithium salt within these ranges may be disposed in, e.g., injected into, the lithium metal battery. The electrolyte precursor may have a low viscosity due to including the low concentration of the lithium salt. The electrolyte precursor having a low viscosity may be more easily injected into the lithium metal battery including a high-density positive electrode.

Subsequently, the lithium metal battery after the injection of the electrolyte precursor thereinto may be subjected to hermetic immersion at 60° C. for about 10 hours or less with a temperature rise rate of about 1° C./min to about 3° C./min. When the temperature rise rate is within this range, the glyme solvent remaining unsolvated may have an improved removal efficiency.

For example, the hermetic immersion may be performed at a reaction temperature of about 30° C. to about 60° C. for about 2 hours to about 6 hours.

Through the above-described hermetic immersion process, the lithium metal battery according to an embodiment, including an electrolyte containing an SIL, e.g., a complex of the glyme solvent and the lithium salt, may be manufactured. During the hermetic immersion process, the unsolvated glyme solvent that remains and does not form the complex with the lithium salt, and, while not wanting to be bound by theory, it is understood to be vulnerable to oxidation, may be partially or totally removed, and the two electrodes may be uniformly impregnated with the electrolyte.

In an embodiment, the electrolyte after the hermetic immersion may have a viscosity of about 2.5 cP or greater, and in some embodiments, about 2.5 cP to about 3.7 cP, about 2.6 cP to about 3.7 cP, or about 2.7 cP to about 3.7 cP.

The electrolyte of the lithium metal battery according to an embodiment may include a complex of the glyme solvent and the lithium salt, the complex having a lower vapor pressure than the glyme solvent present as free molecules, so that the electrolyte may have improved high temperature characteristics and improved stability against decomposition at high voltage.

Next, the lithium metal battery may be operated.

The electrolyte of the lithium metal battery according to an embodiment may comprise an electrolyte according to an embodiment.

In an embodiment, the lithium metal battery may further include, in addition to an electrolyte according to an embodiments, at least one selected from a liquid electrolyte, a solid electrolyte, a gel electrolyte, and a polymer ionic liquid that are suitable for a lithium metal battery.

In another embodiment, the lithium metal battery may further include: a liquid electrolyte; at least one selected from a solid electrolyte, a gel electrolyte, and a polymer ionic liquid; and a separator.

The liquid electrolyte may further include at least one selected from an organic solvent, an ionic liquid, and a lithium salt.

The organic solvent may comprise any organic solvent that is suitable for a lithium metal battery. Non-limiting examples of the organic solvent may include a carbonate compound, a glyme compound, a dioxolane compound, or the like.

The carbonate compound may comprise, for example, ethylene carbonate, propylene carbonate, dimethyl carbonate, fluoroethylene carbonate, diethyl carbonate, or ethylmethyl carbonate.

The glyme compound may comprise, for example, at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

The dioxolane compound may comprise, for example, at least one selected from 1,3-dioxolane, 4,5-diethyl-dioxolane, 4,5-dimethyl-dioxolane, 4-methyl-1,3-dioxolane, and 4-ethyl-1,3-dioxolane.

The organic solvent may comprise, for example, 2,2-dimethoxy-2-phenylacetophenone, dimethoxyethane, diethoxyethane, tetrahydrofuran, or γ-butyrolactone.

The gel electrolyte may comprise any suitable electrolyte in gel form known in the art. For example, the gel electrolyte may include a polymer and a polymer ionic liquid. For example, the polymer may be a solid graft (block) copolymer electrolyte.

The solid electrolyte may comprise, for example, an organic solid electrolyte or an inorganic solid electrolyte. Non-limiting examples of the organic solid electrolyte may include polyethylene derivatives, polyethylene oxide derivatives, polypropylene oxide derivatives, a phosphoric acid ester polymer, a polyester sulfide, a polyvinyl alcohol, a polyfluoride vinylidene, and polymers including ionic dissociative groups.

The inorganic solid electrolyte may comprise, for example, at least one selected from among $Cu_3N$, $Li_3N$, LiPON, $Li_3PO_4 \cdot Li_2S \cdot SiS_2$, $Li_2S \cdot GeS_2 \cdot Ga_2S_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $NLi_{0.3}La_{0.5}TiO_3$, $Na_5MSi_4O_{12}$ (wherein M may be a rare earth element, such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 \leq x \leq 0.8$, $0 \leq y \leq 1.0$, and M may be Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 < y \leq 0.6$, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M may be Nb or Ta), and $Li_{7+x}A_xLa_{3-x}Zr_2O_{12}$ (wherein $0 < x < 3$ and A may be Zn).

The polymer ionic liquid may comprise, for example, a polymerization product of ionic liquid monomers, or a polymeric compound. The polymer ionic liquid is soluble in an organic solvent, and thus may further improve the ionic conductivity of the electrolyte when further added.

When the ionic liquid is a polymeric ionic liquid obtained by polymerization of ionic liquid monomers as described above, a resulting product from the polymerization reaction may be washed and dried, followed by an anionic substitution reaction to prepare appropriate anodes that may improve solubility in an organic solvent.

In an embodiment, the polymer ionic liquid may include a repeating unit that includes i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and mixtures thereof, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_3^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In another embodiment, the polymer ionic liquid may be prepared by polymerization of ionic liquid monomers. The ionic liquid monomers may have a functional group polymerizable with a vinyl group, an allyl group, an acrylate group, and a methacrylate group, and may include a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and mixtures thereof, and at least one of the above-listed anions.

Non-limiting examples of the ionic liquid monomers are 1-vinyl-3-ethylimidazolium bromide, a compound represented by Formula 4, or a compound represented by Formula 5.

Formula 4

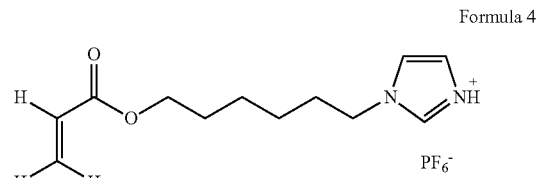

Formula 5

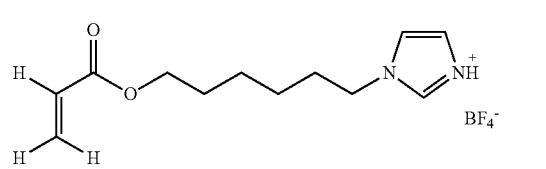

For example, the polymer ionic liquid may be a compound represented by Formula 6 or a compound represented by Formula 7.

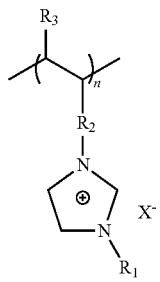

Formula 6

In Formula 6, $R_1$ and $R_3$ may be each independently a hydrogen atom, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group; $X^-$ indicates an anion of the polymer ionic liquid; and n may be from about 500 to about 2800.

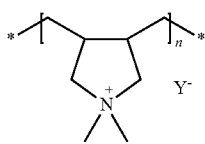

Formula 7

In Formula 7, $Y^-$ may be defined the same as $X^-$ in Formula 6; and n may be in a range of about 500 to about 2800.

For example, in Formula 7, $Y^-$ may be bis(trifluoromethanesulfonyl)imide (TFSI), $BF_4$, or $CF_3SO_3$. The polymer ionic liquid may include, for example, a cation selected from poly(1-vinyl-3-alkylimidazolium), poly(1-allyl-3-alkylimidazolium), poly(1-(methacryloyloxy-3-alkylimidazolium), and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

For example, the compound of Formula 7 may be polydiallydimethyl ammonium bis(trifluoromethylsulfonyl)imide.

In an embodiment, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethylene glycol dimethylether (polyglyme), tetraethylene glycol dimethyl ether (tetraglyme), and triethylene glycol dimethylether (triglyme).

For example, the low-molecular weight polymer may have a weight average molecular weight of about 75 to about 2000 Daltons (Da), and in some embodiments, about 250 to about 500 Da.

FIG. 1 is a schematic view illustrating a structure of a lithium metal battery 11 according to an embodiment.

Referring to FIG. 1, the lithium metal battery 11 may include a positive electrode 13, a lithium negative electrode 12, and a separator 14. The positive electrode 13, the negative electrode 12, and the separator 14 as described above may be wound, stacked, or folded, and then accommodated in a battery case 15. Subsequently, an electrolyte according to an embodiment may be injected into the battery case 15, followed by sealing the battery case 15 with a cap assembly not shown, thereby completing the manufacture of the lithium metal battery 11. The battery case 15 may have a cylindrical, rectangular, pouch, or thin film shape. For example, the lithium metal battery 11 may be a large-sized thin film-type battery, for example, a lithium ion battery.

A lithium metal battery according to an embodiment may have improved lifetime characteristics and high rate characteristics, and thus may be used in, for example, electric vehicles (EVs) such as long-distance EVs. For example, the lithium metal battery may be used in hybrid vehicles such as plug-in hybrid electric vehicles (PHEV) or the like. The lithium metal battery may also be used in the fields where storage of a large amount of power is required. For example, the lithium battery may be used in electric bikes, power tools, and the like.

In an embodiment, the electrolyte for a lithium metal battery, according to an embodiment, may improve high-rate characteristics of a solid electrolyte used for safety purposes, and thus may be used together with a solid electrolyte.

An embodiment of the present disclosure will now be described in further detail with reference to the following examples. However, these examples are only for illustrative purposes and are not intended to limit the scope of the present disclosure.

EXAMPLES

Example 1

Lithium bis(fluorosulfonyl)imide (LiFSI) as a lithium salt and ethylene glycol dimethyl ether (1,2-dimethoxyethane) (DME) were mixed together to prepare a 1 molar (M) electrolyte precursor.

The electrolyte precursor was injected into a lithium metal battery assembly (coin cell) that was manufactured by stacking a lithium metal electrode, a polyethylene/polypropylene separator (G1212A, Asahi Kasei), and stainless steel on one another.

The lithium metal battery, into which the electrolyte precursor was injected, was subjected to hermetic immersion at about 50° C. for about 2 hours, thereby manufacturing a lithium metal battery (coin cell) including a 3.5 M LiFSI SIL electrolyte.

Example 2

A lithium metal battery (pouch cell) was manufactured as follows.

A positive electrode was placed between two lithium metal negative electrodes, with one sheet of a polyethylene/polypropylene separator (G1212A, Asahi Kasei) between the positive electrode and each of the lithium metal negative electrodes.

The positive electrode was manufactured as follows. $LiCoO_2$, a conducting agent (Super-P, available from Timcal Ltd.), polyvinylidene fluoride (PVdF), and N-pyrrolidone were mixed together to obtain a positive electrode composition. A weight ratio of $LiCoO_2$, the conducting agent, and PVdF in the positive electrode composition was about 97:1.5:1.5.

The positive electrode composition was coated on a surface of an aluminum foil (thickness: about 15 μm), dried at about 25° C., and further dried at about 110° C. under vacuum, to thereby manufacture the positive electrode.

After an aluminum tap and a nickel tap were welded to the positive electrode and the lithium metal negative electrodes, respectively, to obtain a cell body, this cell body including the positive and negative electrodes was wrapped with an aluminum pouch, with the aluminum and nickel taps taken out of the aluminum pouch and one side of the aluminum pouch open for electrolyte injection.

A 1 M electrolyte precursor was prepared by mixing lithium bis(fluorosulfonyl)imide (LiFSI) as a lithium salt and ethylene glycol dimethyl ether (1,2-dimethoxyethane). About 3 g of the electrolyte precursor were injected into the lithium metal battery through the open side of the aluminum pouch, followed by hermetic immersion in a vacuum oven at about 50° C. for about 2 hours, thereby manufacturing a lithium metal battery (pouch cell) including a 3.5 M LiFSI SIL electrolyte.

Example 3

A lithium metal battery (coin cell) was manufactured in the same manner as in Example 1, except that the lithium metal battery after the injection of the electrolyte precursor was subjected to hermetic immersion at about 50° C. for about 6 hours.

Example 4

A lithium metal battery (coin cell) was manufactured in the same manner as in Example 1, except that the temperature of the hermetic immersion was changed to about 60° C.

Example 5

A lithium metal battery (coin cell) was manufactured in the same manner as in Example 1, except that the temperature of the hermetic immersion was changed to about 30° C.

Example 6

A lithium metal battery (coin cell) was manufactured in the same manner as in Example 1, except that the lithium metal battery after the injection of the electrolyte precursor was subjected to hermetic immersion at about 60° C. for about 6 hours.

Example 7

A lithium metal battery (coin cell) was manufactured in the same manner as in Example 1, except that the lithium metal battery after the injection of the electrolyte precursor was subjected to hermetic immersion at about 30° C. for about 6 hours.

Example 8

A lithium metal battery (coin cell) was manufactured in the same manner as in Example 1, except that ethylene glycol diethylether, instead of ethylene glycol dimethyl ether (1,2-dimethoxyethane), was used.

Example 9

A lithium metal battery (coin cell) was manufactured in the same manner as in Example 1, except that a 0.8 M electrolyte precursor, instead of the 1 M electrolyte, was used.

Example 10

A lithium metal battery (coin cell) was manufactured in the same manner as in Example 1, except that a 2 M electrolyte precursor, instead of the 1 M electrolyte, was used.

Comparative Example 1

A 1 M electrolyte was prepared by mixing lithium bis(fluorosulfonyl)imide (LiFSI) as a lithium salt and ethylene glycol dimethyl ether (1,2-dimethoxyethane).

The electrolyte was injected into a lithium metal battery (coin cell) that was manufactured by stacking a lithium metal electrode, a polyethylene/polypropylene separator (G1212A, Asahi Kasei), and stainless steel on one another.

Comparative Example 2

A 4 M electrolyte was prepared by mixing lithium bis(fluorosulfonyl)imide (LiFSI) as a lithium salt and ethylene glycol dimethyl ether (1,2-dimethoxyethane).

The electrolyte was injected into a lithium metal battery (coin cell) that was manufactured by stacking a lithium metal electrode, a polyethylene/polypropylene separator (G1212A, Asahi Kasei), and stainless steel on one another.

Evaluation

Evaluation Example 1: Viscosity and Ion Conductivity Test

1) Examples 1, 9-10 and Comparative Example 1-2

Molar concentrations of the electrolyte precursors and electrolytes of Example 1, Examples 9 and 10, and Comparative Examples 1 and 2, and viscosities and ion conductivities of the electrolytes are shown in Table 1.

The viscosity of each of the electrolytes was measured using a rheometer (MCR 302, available from Anton Paar, Rheoplus software) equipped with a tip (CP50-1), in which an average viscosity was calculated from the viscosities measured at about 25° C. at a 25-second interval by dipping each of the electrolytes at five spots with the tip.

The ionic conductivity of each of the electrolytes was evaluated by measuring a resistance at a voltage bias of about 10 mV in a frequency range of about 1 Hz to 1 MHz.

The evaluation results are shown in Table 1.

TABLE 1

| Example | Molar concentration of electrolyte precursor (M) | Molar concentration of electrolyte (M) | Viscosity (cP) | Ion conductivity (mS/cm) |
|---|---|---|---|---|
| Example 1 | 1 | 3.5 | 2.5 | 3.5 |
| Example 9 | 0.8 | 5.5 | 3.0 | 3.9 |
| Example 10 | 2 | 7.5 | 3.7 | 2.3 |
| Comparative Example 1 | 1 | 1 | — | — |
| Comparative Example 2 | 4 | 4 | — | — |

Referring to Table 1, the electrolytes of Examples 1, 9, and 10 were found to have an appropriate viscosity and improved ion conductivity even at a higher electrolyte concentration.

Evaluation Example 2: Linear Sweep Voltammetry (LSV)

1) Example 1 and Comparative Example 1

Electrochemical stabilities of the lithium metal batteries using the electrolytes prepared according to Example 1 and Comparative Example 1 were evaluated by LSV at a scan rate of about 0.5 mV/s in a voltage range of about 3.0 V to about 5.0 V (vs. Li/Li$^+$). The LSV analysis results of the lithium metal batteries of Examples 1 to 3 and Comparative Example 1 are shown in FIG. 3.

Figure 3:
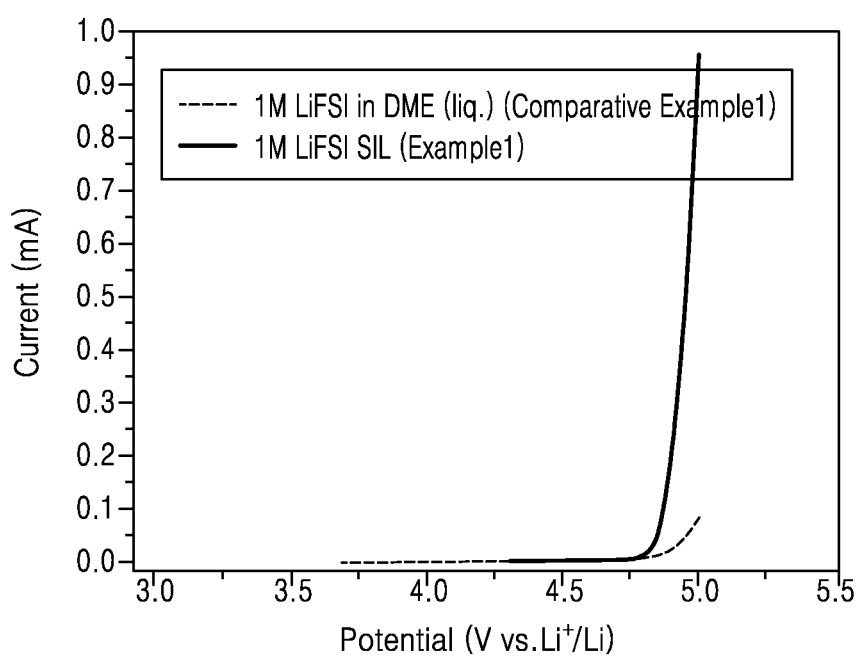
FIG. 3 is a graph of current (milliamperes, mA) versus potential (voltage versus Li/Li$^+$), illustrating the results of linear sweep voltammetry (LSV) analysis on the lithium metal batteries of Example 1 and Comparative Example 1.

Referring to FIG. 3, as a result of the evaluation, the lithium metal battery of Example 1 was found to have a higher onset potential on the LSV diagram and thus improved electrochemical stability at a high voltage (about 5 V or less), compared to the lithium metal battery of Comparative Example 1.

The electrochemical stabilities of the lithium metal batteries of Examples 9 and 10 were evaluated in the same manner as above applied to the lithium metal battery of Example 1.

As a result of the evaluation, the lithium metal batteries of Examples 9 and 10 were found to have nearly equivalent electrochemical stability to the lithium metal battery of Example 1.

2) Example 1 and Comparative Example 2

Electrochemical stabilities of the lithium metal batteries of Example 1 and Comparative Example 2 were evaluated by LSV at a scan rate of about 0.5 mV/s in a voltage range of about 3.0 V to about 5.0 V (vs. Li/Li$^+$). The LSV results of the lithium metal batteries of Example 1 and Comparative Example 1 are shown in FIG. 4.

Figure 4:
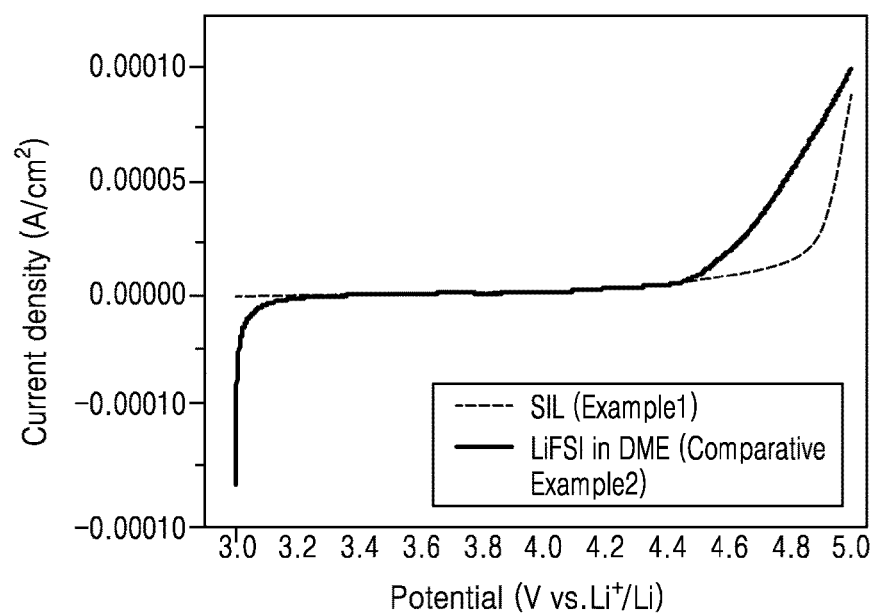
FIG. 4 is a graph of current density (amperes per square centimeter) versus potential (voltage versus Li/Li$^+$), illustrating the results of LSV analysis on the lithium metal batteries of Example 1 and Comparative Example 2.

Referring to FIG. 4, the lithium metal battery of Example 1 was found to have a higher onset potential by about 0.4 V, compared to the lithium metal battery of Comparative Example 2, and thus further improved electrochemical stability at high voltages (about 5 V or less), compared to the lithium metal battery of Comparative Example 2.

Evaluation Example 3: Initial Impedance

1) Example 1 and Comparative Example 2

Initial impedance characteristics of the lithium metal batteries of Example 1 and Comparative Example 2 were evaluated by measuring resistance according to a 2-probe method using an impedance analyzer (Solartron 1260A Impedance/Gain-Phase Analyzer) at about 25° C. in a frequency range of about $10^6$ to 0.1 MHz at a voltage bias of about 10 mV.

Figure 5:
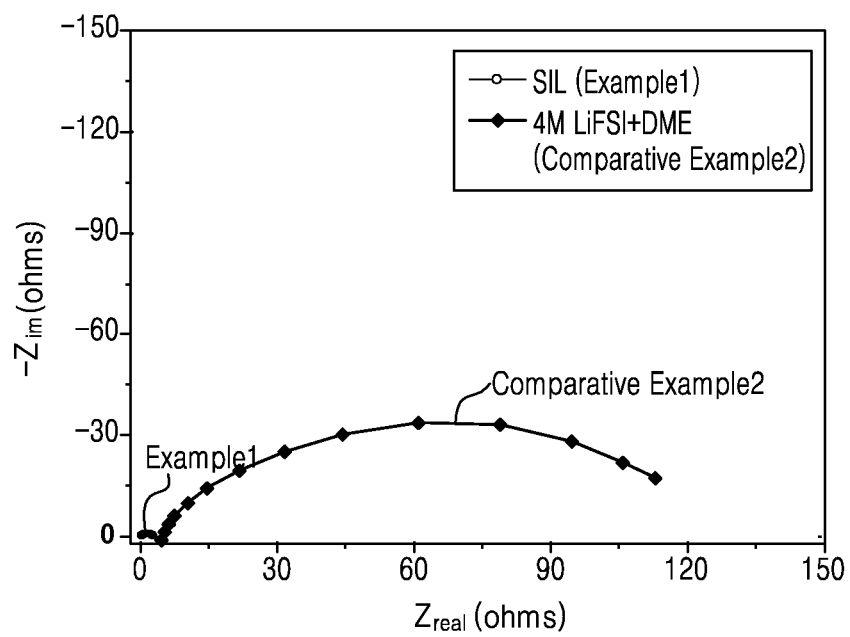
FIG. 5 is a Nyquist plot and is a graph of imaginary impedance ($-Z_{im}$, ohms) versus real impedance ($Z_{real}$, ohms) for the lithium metal batteries of Example 1 and Comparative Example 2, obtained through an impedance measurement 24 hours after the manufacture of the lithium metal batteries analyzed.
Figure 6:
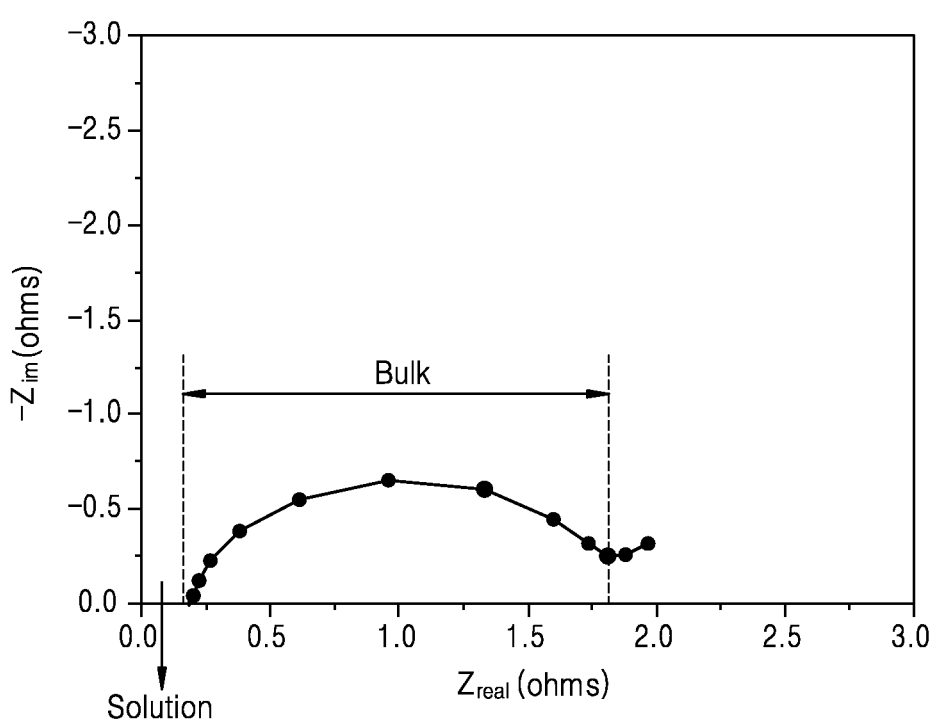
FIG. 6 is a graph of imaginary impedance ($-Z_{im}$, ohms) versus real impedance ($Z_{real}$, ohms), showing a magnified view of FIG. 1 and illustrating the results from the liquid metal battery of FIG. 5.

Nyquist plots obtained from the results of the impedance measurements that were performed in 24 hours from the manufacture of the lithium metal batteries of Example 1 and Comparative Example 2 are shown in FIG. 5. FIG. 6 is a magnified view of FIG. 5, illustrating the results from the lithium metal battery of Example 1. In FIGS. 5 and 6, a bulk resistance of an electrode depends from the position and size of a semicircle, and may be represented as a difference between the left x-intercept and the right x-intercept of the semicircle.

Figure 9:
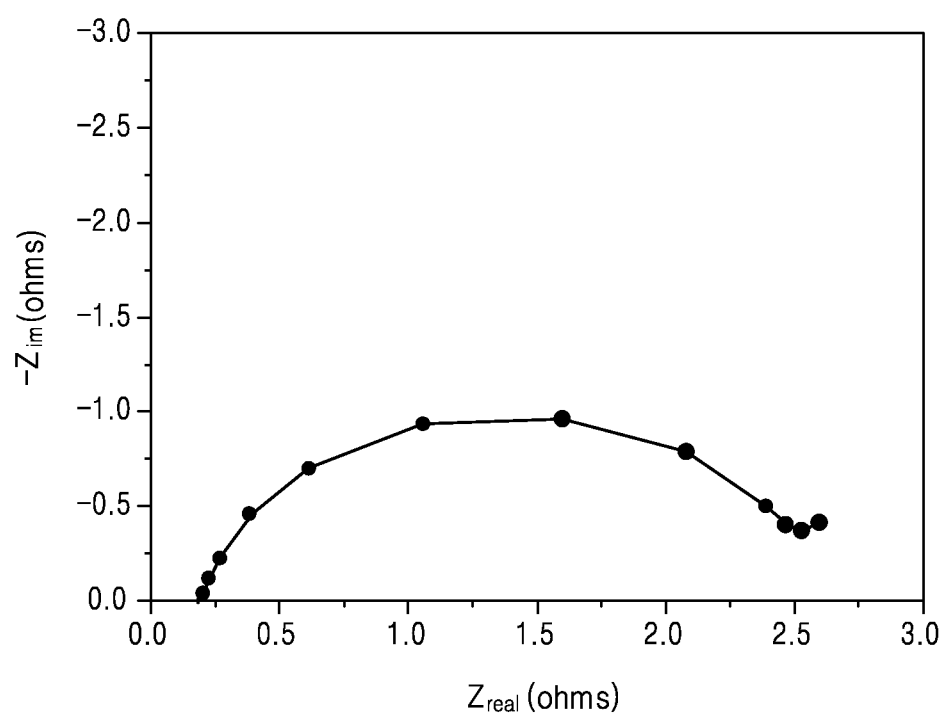
FIG. 9 is a graph of imaginary impedance ($-Z_{im}$, ohms) versus real impedance ($Z_{real}$, ohms) showing the initial impedance characteristics of a lithium metal battery of FIG. 2.

The initial solution resistances and the bulk resistances of the lithium metal batteries of Example 1 and Comparative Example 2, obtained based on the results in FIGS. 5 and 9, are shown in Table 2.

TABLE 2

| Example | Initial solution resistance (Ω) | Bulk resistance (Ω) |
|---|---|---|
| Example 1 | 0.25 | 2.5 |
| Comparative Example 2 | 7 | 120 |

Referring to Table 2, the lithium metal battery of Comparative Example 2 using the high-concentration (4 M), high-viscosity electrolyte was found to have poor initial solution resistance and bulk resistance characteristics, obtained from the initial impedance, due to the reduced electrode impregnation ability of the electrolyte.

On the other hand, the lithium metal battery of Example 1 was found to have a significantly reduced initial solution resistance and bulk resistance characteristics, compared to the lithium metal battery of Comparative Example 2. From these results, the lithium metal battery of Example 1 was found to have an improved initial impregnation ability of the electrolyte in the electrode, compared to the electrolyte of Comparative Example 2.

Impedance characteristics of the lithium metal batteries of Example 1 and Comparative Example 2 were evaluated after left for about 1 hour from the initial impedance characteristic evaluation.

The results of the impedance characteristic evaluation were similar as those from the initial impedance characteristic evaluation, indicating that the lithium metal battery of Example 1 has further improved lifetime and high-rate characteristics, compared to the lithium metal battery of Comparative Example 2.

2) Example 2

Initial impedance characteristics of the lithium metal battery (pouch cell) of Example 2 were evaluated in the same manner as the lithium metal batteries of Example 1 and Comparative Example 2. The results are shown in FIG. 9.

Referring to FIG. 9, the lithium metal battery of Example 2 had a bulk resistance of about 2.5Ω.

Evaluation Example 4: Impedance after One Cycle

Impedance characteristics after one cycle of the lithium metal batteries of Example 2 and Comparative Example 2 were evaluated in the following manner.

Each of the lithium metal batteries of Example 2 and Comparative Example 2 was charged at about 25° C. with a constant current of 0.1 Coulomb (C) rate to a voltage of about 4.30 Volts (V) (with respect to Li), and then with a constant voltage of 4.30 V until a cutoff current of 0.05 C, and was then discharged with a constant current of 0.1 C to a voltage of about 2.8 V (with respect to Li) (Formation process, 1$^{st}$ cycle).

After the formation process, impedance characteristics of the lithium metal batteries of Example 2 and Comparative Example 2 were evaluated by measuring resistance according to a 2-probe method using an impedance analyzer (Solartron 1260A Impedance/Gain-Phase Analyzer) in a frequency range of about $10^6$ to 0.1 Hz at a voltage bias of about 10 mV at about 25° C.

Figure 7:
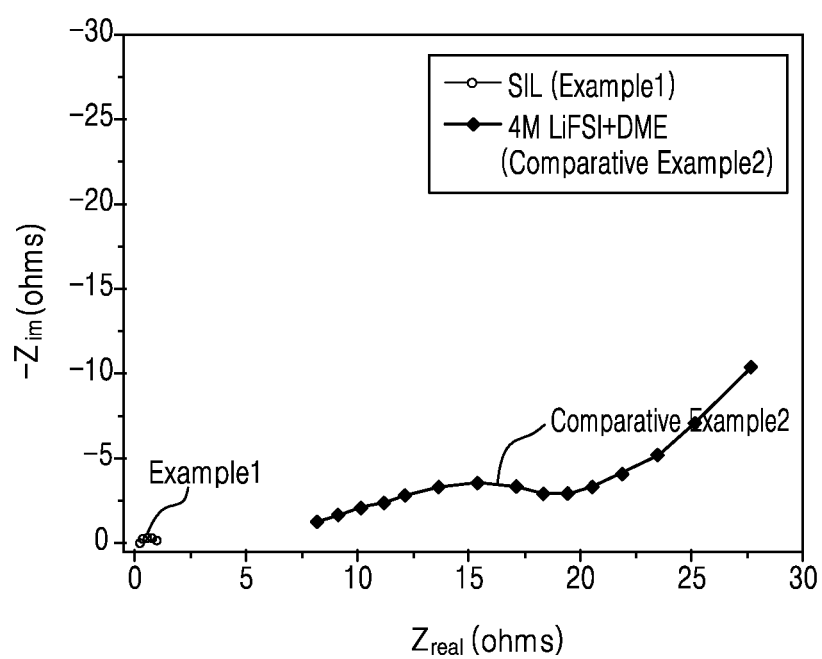
FIG. 7 is a graph of imaginary impedance ($-Z_{im}$, ohms) versus real impedance ($Z_{real}$, ohms), showing the impedance characteristics after one cycle of the lithium metal batteries of Example 1 and Comparative Example 2.
Figure 8:
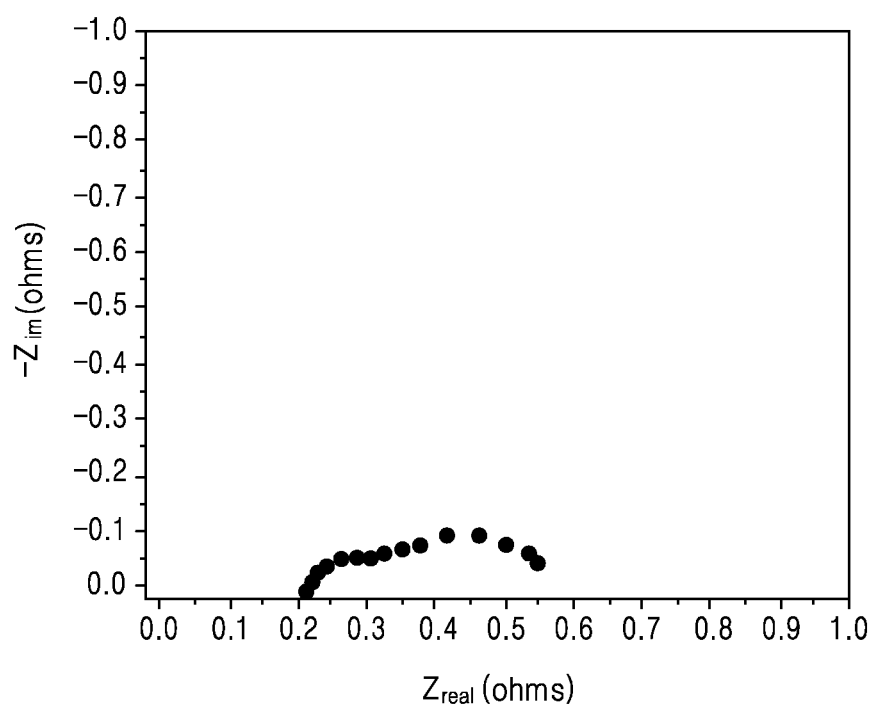
FIG. 8 is a graph of imaginary impedance ($-Z_{im}$, ohms) versus real impedance ($Z_{real}$, ohms), showing a magnified view of FIG. 7 and illustrating the impedance characteristics after one cycle of the lithium metal battery of Example 1.

Nyquist plots obtained from the impedance measurements that were performed after 24 hours from the manufacture of the lithium metal batteries of Example 2 and Comparative Example 2 are shown in FIG. 7. FIG. 8 is a magnified Nyquist plot of the lithium metal battery of Example 2 in FIG. 7.

The solution resistances and the bulk resistances of the lithium metal batteries of Example 2 and Comparative Example 2, obtained based on the results in FIGS. 7 and 6, are shown in Table 3.

TABLE 3

| Example | Solution resistance (Ω) | Bulk resistance (Ω) |
|---|---|---|
| Example 1 | 0.2 | 0.4 |
| Comparative Example 2 | 7 | 18 |

Referring to FIGS. 7 and 8, and Table 3, the lithium metal battery of Example 1 was found to have reduced solution resistance and bulk resistance after one cycle, compared to the lithium metal battery of Comparative Example 2.

Evaluation Example 5: Deposition Density

1) Deposition Density at 25° C. of Lithium Deposition Layer of Lithium Metal Battery Deposition density of the lithium metal battery of Example 1 was evaluated in the following manner.

The lithium metal battery of Example 1 was charged at about 25° C. with a constant current of 0.1 C (0.38 mA/cm$^2$) to a voltage of about 4.40 V (with respect to Li), and then with a constant voltage of 4.40 V until a cutoff current of 0.05 C.

After a rest period of about 10 minutes, the lithium metal battery was discharged at a constant current of 0.1 C, 0.5 C, 0.7 C, or 1 C to a voltage of about 2.5 V. In particular, with periodic changing of the discharge rate to 0.1 C, 0.5 C, 0.7 C, or 1 C at every increase in charge and discharge cycle number, the thickness of the lithium deposition layer on the lithium metal electrode of each of the lithium metal batteries was measured to evaluate the deposition density of the lithium deposition layer. The results of the deposition density evaluation are shown in FIG. 10.

Figure 10:
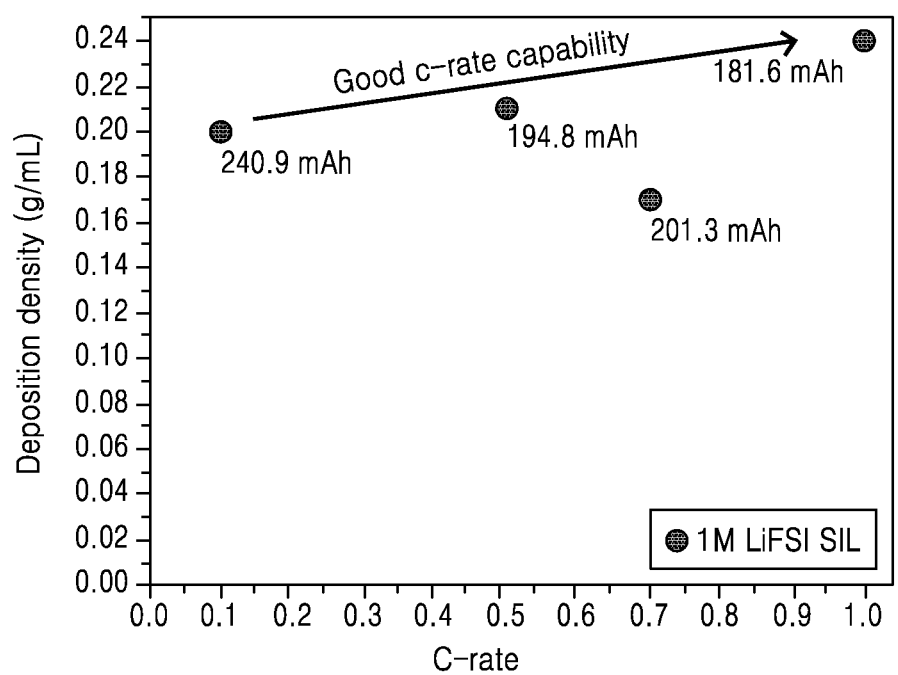
FIG. 10 is a graph of deposition density (grams per milliliter, g/mL) versus discharge rate (C-rate), showing the deposition density characteristics at 25° C. for the lithium metal battery of Example 1.

Referring to FIG. 10, the lithium metal battery of Example 1 was found to have improved rate capability and improved deposition density characteristics of the lithium deposition layer.

2) Deposition Density Characteristics at 45° C. of Lithium Deposition Layer of Lithium Metal Battery The lithium metal battery of Example 1 was charged at about 45° C. with a constant current of 0.1 C (0.38 mA/cm$^2$) to a voltage of about 4.40 V (with respect to Li), and then with a constant voltage of 4.40 V until a cutoff current of 0.05 C.

After a rest period of about 10 minutes, the lithium metal battery was discharged at a constant current 0.1 C or 0.7 C to a voltage of about 2.5 V. In particular, with periodic changing of discharge rate to 0.1 C or 0.7 C at every increase in charge and discharge cycle number, the thickness of the lithium deposition layer on the lithium metal electrode of each of the lithium metal batteries was measured to evaluate the deposition density of the lithium deposition layer. The results of the deposition density evaluation are shown in FIG. 11.

Figure 11:
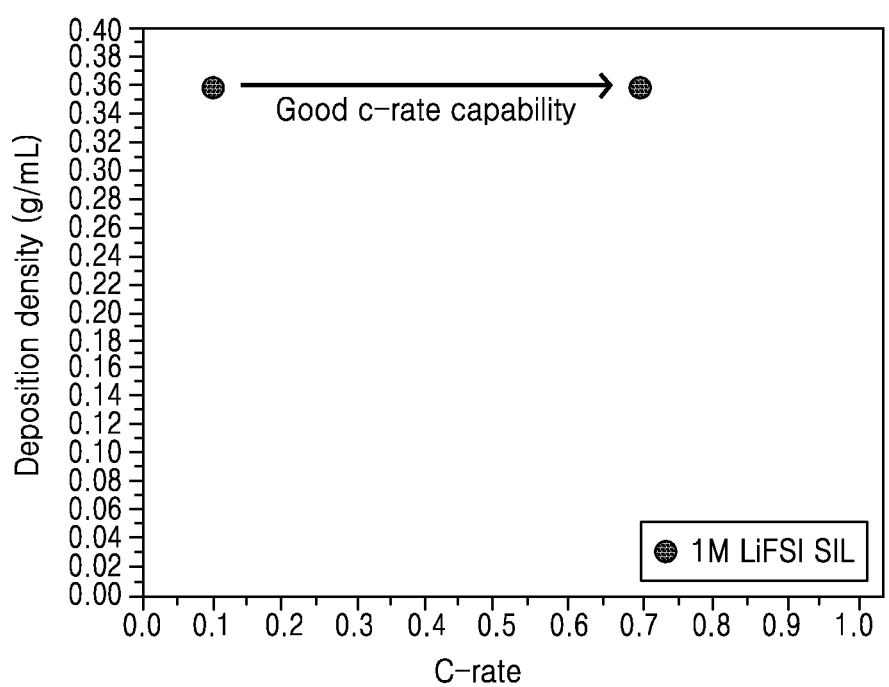
FIG. 11 is a graph of deposition density (grams per milliliter, g/mL) versus discharge rate (C-rate), showing the deposition density characteristics at 45° C. for the lithium metal battery of Example 1.

Referring to FIG. 11, the lithium metal battery of Example 1 was found to have good deposition density characteristics of the lithium deposition layer at 45° C.

Evaluation Example 6: Charge-Discharge Characteristics at Room Temperature (Discharge Capacity and Lifetime Characteristics)

Each of the lithium metal batteries of Example 1 and Comparative Examples 9 and 10 was charged at about 25° C. with a constant current of 0.1 C to a voltage of about 4.30 V (with respect to Li), and then with a constant voltage of 4.30 V until a cutoff current of 0.05 C, and was then discharged with a constant current of 0.1 C to a voltage of about 2.8 V (with respect to Li) (Formation process, 1$^{st}$ cycle). This charging and discharging process was performed twice more to complete the formation process.

Each of the lithium metal batteries after the formation process was charged at room temperature (25° C.) with a constant current of 0.5 C in a voltage range of about 3.0 V to 4.4 V (with respect to Li) and then discharged with a constant current of 0.2 C (0.72 mA) until a cutoff voltage of 4.4 V. This charging and discharging cycle was repeated 99 times further, i.e., 100 times in total. The capacity retention (%) of each of the lithium metal batteries was calculated using Equation 1.

Capacity retention (%)=(100$^{th}$-cycle discharge capacity/1$^{st}$-cycle discharge capacity)×100%  Equation 1

Figure 12:
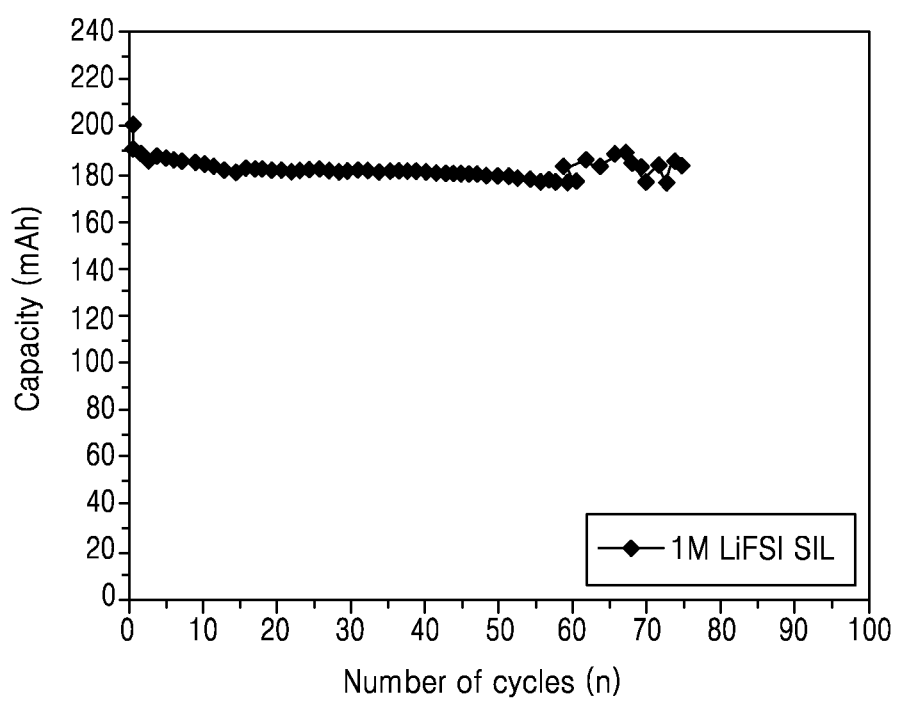
FIG. 12 is a graph of capacity (milliampere hours, mAh) versus cycle number (n), showing the discharge capacity at 25° C. with respect to number of cycles for the lithium metal battery of Example 1.
Figure 13:
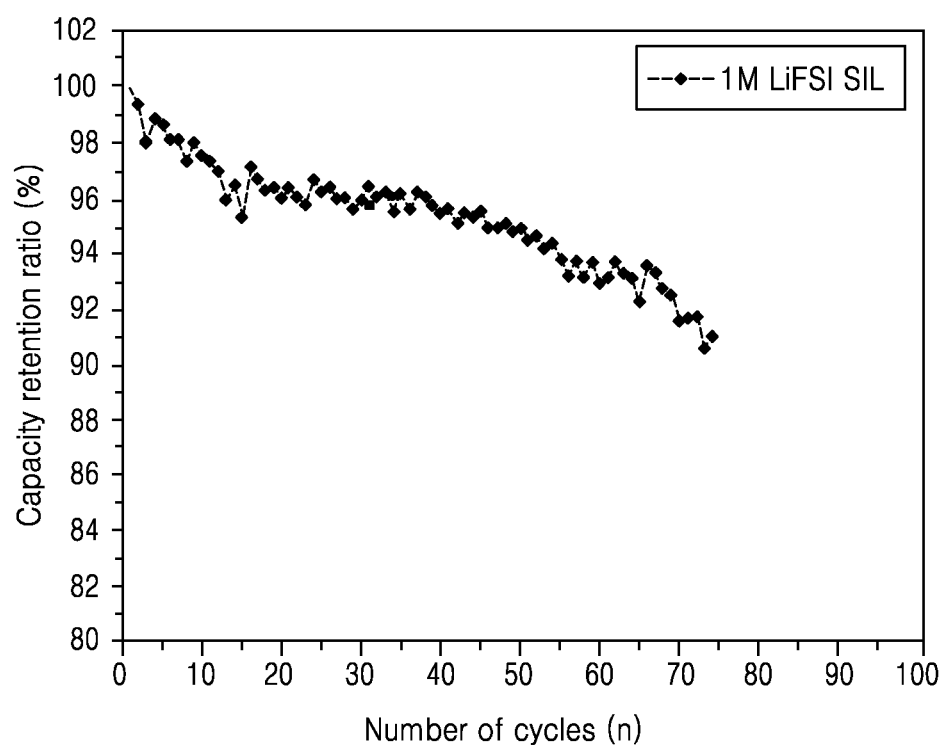
FIG. 13 is a graph of capacity retention (%) versus cycle number (n) at 25° C. for the lithium metal batteries of Examples 1 and 2.

Changes in discharge capacity and capacity retention with respect to the number of cycles at 25° C. in the lithium metal battery of Example 1 are shown in FIGS. 12 and 13, respectively. Referring to FIGS. 12 and 13, the lithium metal battery of Example 1 was found to have good discharge capacity characteristics and capacity retention rate characteristics.

Evaluation Example 7: High-Temperature Charge-Discharge Characteristics (Discharge Capacity and Capacity Retention)

The lithium metal battery of Example 1 was charged at about 45° C. with a constant current of 0.1 C to a voltage of about 4.30 V (with respect to Li), and then with a constant voltage of 4.30 V until a cutoff current of 0.05 C, and was then discharged with a constant current of 0.1 C to a voltage of about 2.8 V (with respect to Li) (Formation process, 1$^{st}$ cycle). This charging and discharging process was performed twice more to complete the formation process.

The lithium metal battery after the formation process was charged at 45° C. with a constant current of 0.5 C in a voltage range of about 3.0 V to 4.4 V (with respect to Li) and then discharged with a constant current of 0.2 C (0.72 mA) until a cutoff voltage of 4.4 V. This charging and discharging cycle was repeated 85 times.

Figure 14:
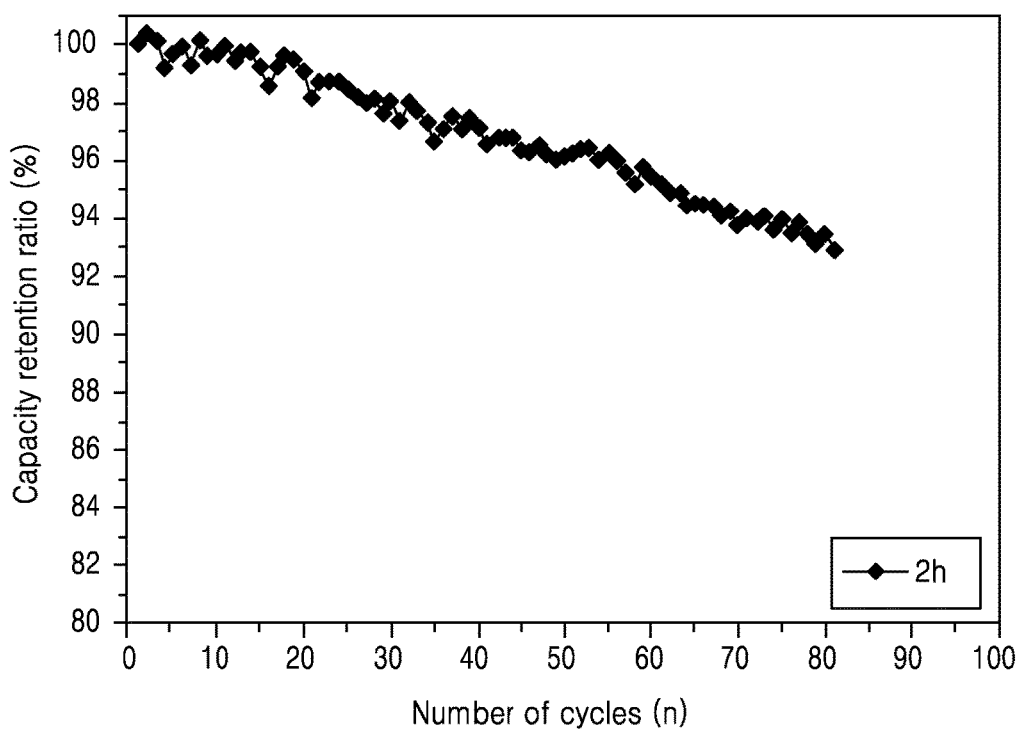
FIG. 14 is a graph of capacity retention (%) versus cycle number (n) at 45° C. for the lithium metal battery of Example 1.
Figure 15:
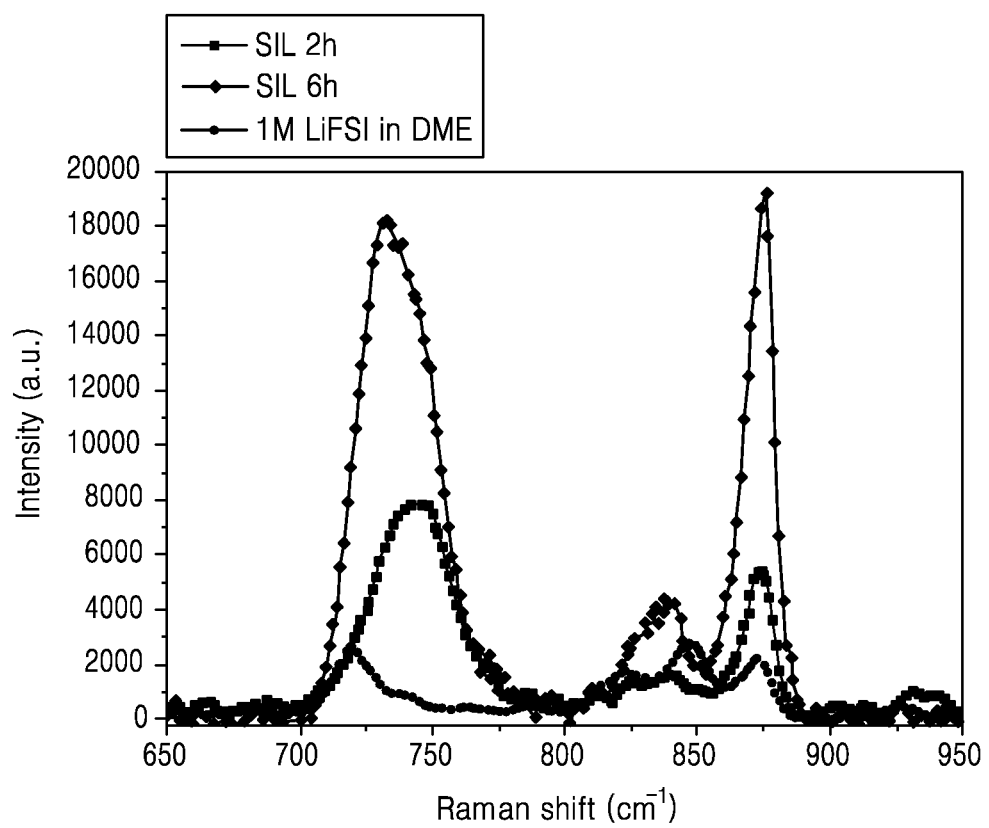
FIG. 15 is a graph of intensity (arbitrary units, a.u.) versus Raman shift (inverse centimeters, $cm^{-1}$) showing the Raman spectra of the electrolytes of the lithium metal batteries of Example 1, Example 3, and Comparative Example 1.

Changes in discharge capacity and capacity retention rate characteristics at 45° C. with respect to the number of cycles in the lithium metal battery of Example 1 are shown in FIG. 14, respectively. Referring to FIGS. 14 and 15, the lithium metal battery of Example 1 was found to have good discharge capacity characteristics and capacity retention rate characteristics at 45° C.

Evaluation Example 8: Raman Spectroscopy

1) Examples 1 and 3, and Comparative Example 1

The electrolyte of each of the lithium metal batteries of Example 1, Example 3, and Comparative Example 1 was analyzed by Raman spectroscopy with a Renishaw inVia Raman spectrometer.

Figure 16:
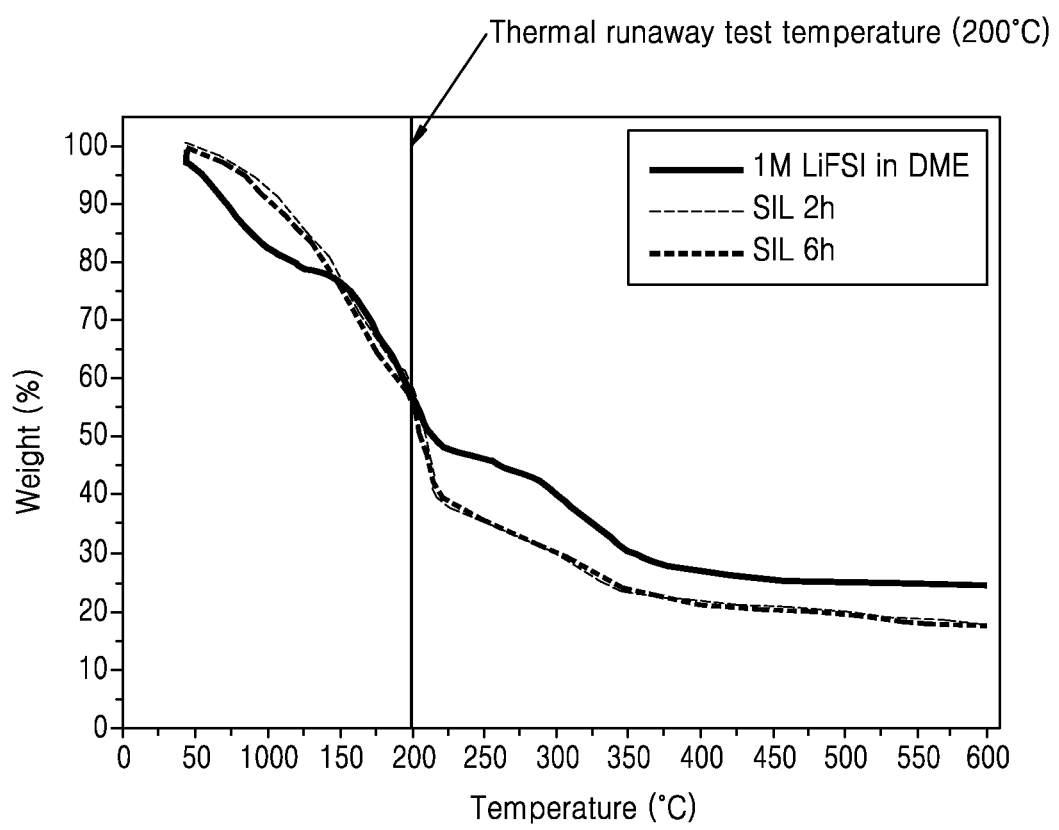
FIG. 16 is a graph of weight (%) versus temperature (° C.), illustrating the results of thermogravimetric analysis (TGA) on the electrolytes of Example 1, Example 3, and Comparative Example 1.

The Raman spectroscopic results are shown in FIG. 16. In FIG. 16, "SIL 2h", "SIL 6h", and "1 M LiFSI in DME" denote the electrolytes of Example 1, Example 5, and Comparative Example 1, respectively, In FIG. 16, the peaks A at a Raman shift of about 820 to 850 $cm^{-1}$ originate from the C—O stretching and $CH_3$ rocking vibration modes of free (unsolvated) 1,2-dimethoxyethane (DME), and the peaks B at a Raman shift of about 860 to 880 $cm^{-1}$ originate from the Li—O breathing vibration mode of DME in the SIL.

Referring to FIG. 16, the electrolytes of Examples 1 and 3 were found to include less free DME molecules and more SIL DME molecules, due to the presence of SIL in the electrolytes, compared to the electrolyte of Comparative Example 1.

2) Example 2 and Example 5

The electrolytes of the lithium metal batteries of Examples 2 and 5 were analyzed by Raman spectroscopy in the same manner as applied to the electrolyte of Example 1.

The electrolyte of Example 2 was found to have an intensity ratio of peak A to peak B of about 0.25, i.e., an intensity ratio of peak A at a Raman shift of about 820 $cm^{-1}$ to about 850 $cm^{-1}$ to peak B at a Raman shift of about 860 $cm^{-1}$ to about 880 $cm^{-1}$. A mixed ratio of DME in the SIL to non-solvated DME may be identified from the intensity ratio of peak A to peak B.

The electrolyte of Example 5 had a peak intensity ratio of about 0.1 of peak A at about 820 $cm^{-1}$ to about 850 $cm^{-1}$ to peak B at about 860 $cm^{-1}$ to about 880 $cm^{-1}$.

Evaluation Example 9: Thermogravimetric Analysis (TGA)

The electrolytes of Example 1, Example 3, and Comparative Example 1 were analyzed by TGA with a Discovery differential scanning calorimeter (DSC, available from TA instruments). The thermogravimetric results are shown in FIG. 17.

Figure 17:
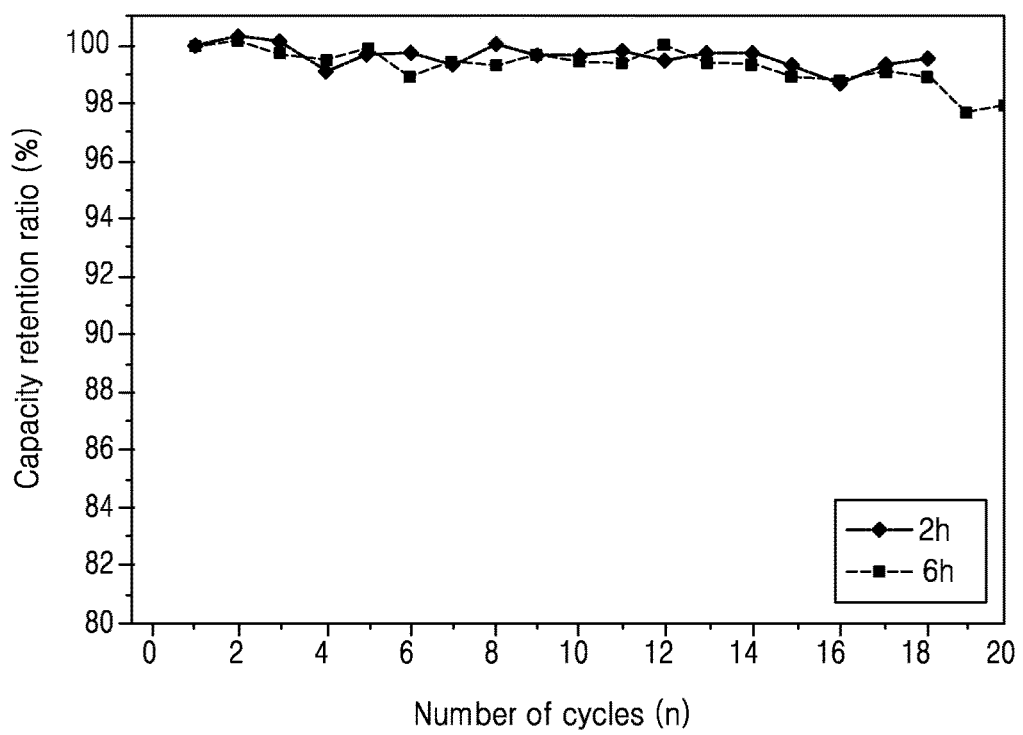
FIG. 17 is a graph of capacity retention (%) versus cycle number (n) for the lithium metal batteries of Examples 1 and 18 that underwent hermetic immersion for 2 hours and 6 hours, respectively.

Referring to FIG. 17, the electrolytes of Examples 1 and 3 were found to have an improved weight loss ratio at about 150° C. or lower, compared with the electrolyte of Comparative Example 1, indicating that the electrolytes of Examples 1 and 3 have further improved thermal stability.

Evaluation Example 10: Capacity Retention

Each of the lithium metal batteries of Examples 1 and 3 was charged at about 25° C. with a constant current of 0.1 C to a voltage of about 4.30 V (with respect to Li), and then with a constant voltage of 4.30 V until a cutoff current of 0.05 C, and was then discharged with a constant current of 0.1 C to a voltage of about 2.8 V (with respect to Li) (Formation process, $1^{st}$ cycle). This charging and discharging process was performed further twice to complete the formation process.

Each of the lithium metal batteries after the formation process was charged at room temperature (25° C.) with a constant current of 0.5 C in a voltage range of about 3.0 V to about 4.4 V (with respect to Li) and then discharged with a constant current of 0.2 C (0.72 mA) until a cutoff voltage of 4.4 V. This charging and discharging cycle was repeated 20 times in total.

The capacity retention of the lithium metal batteries of Examples 1 and 3 were evaluated. The results are shown in FIG. 17. Referring to FIG. 17, the lithium metal batteries of Examples 1 and 3 that underwent hermetic immersion for 2 hours and 6 hours, respectively, were found to have improved capacity retention rates.

As described above, using an electrolyte according to any of the above-described embodiments in a lithium metal battery with a lithium negative electrode may improve the stability of the lithium metal battery, responsiveness to high voltage, and lithium deposition density on the lithium negative electrode.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. An electrolyte for a lithium metal battery, the electrolyte consisting essentially of:
   a solvated ionic liquid comprising a glyme solvent and a lithium salt,
   wherein an amount of the lithium salt is about 3 moles per liter or greater, and
   wherein a lithium metal battery comprising the electrolyte has an initial solution resistance of less than about 1 ohm and a bulk resistance of less than about 10 ohms.

2. The electrolyte of claim 1, wherein an amount of the solvated ionic liquid in the electrolyte is about 100 parts by volume or greater, based on 100 parts by volume of an unsolvated glyme solvent in the electrolyte.

3. The electrolyte of claim 1, wherein the lithium metal battery comprising the electrolyte has a solution resistance after one cycle of about 1 ohm or less.

4. The electrolyte of claim 1, wherein the electrolyte has an ionic conductivity of about 2.3 millisiemens per centimeter to about 5.5 millisiemens per centimeter at 25° C.

5. The electrolyte of claim 1, wherein the glyme solvent has a boiling point of about 90° C. or less.

6. The electrolyte of claim 1, wherein the amount of the lithium salt is from about 3 moles per liter to about 5 moles per liter.

7. The electrolyte of claim 1, wherein the glyme solvent comprises at least one selected from ethylene glycol dimethylether, ethylene glycol diethyl ether, propylene glycol dimethyl ether, propylene glycol diethyl ether, butylene glycol dimethyl ether, butylene glycol diethyl ether, diethylene glycol dimethyl ether, triethylene glycol dimethylether, tetraethylene glycol dimethyl ether, diethylene glycol diethyl ether, triethylene glycol diethyl ether, tetraethylene glycol diethyl ether, dipropylene glycol dimethyl ether, tripropylene glycol dimethyl ether, tetrapropylene glycol dimethyl ether, dipropylene glycol diethyl ether, tripropylene glycol diethyl ether, tetrapropylene glycol diethyl ether, dibutylene glycol dimethyl ether, tributylene glycol dimethyl ether, tetrabutylene glycol dimethyl ether, dibutylene glycol diethyl ether, tributylene glycol diethyl ether, and tetrabutyleneglycol diethylether.

8. The electrolyte of claim 1, wherein the lithium salt comprises at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $Li(FSO_2)_2N$, $LiC_4F_9SO_3$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, LiCl, LiF, LiBr, LiI, $LiB(C_2O_4)_2$, lithium difluoro(oxalato)borate, lithium bis(oxalato)borate, and LiN$(CF_2SO_2)(CF_3CF_2CF_2CF_2SO_2)$.

9. The electrolyte of claim 1, wherein the lithium salt comprises $Li(FSO_2)_2N$.

10. The electrolyte of claim 1, wherein an intensity ratio of a first peak having a Raman shift of about 820 inverse centimeters to about 850 inverse centimeters to a second peak having a Raman shift of about 860 inverse centimeters to about 880 inverse centimeters is about 0.1 or greater.

11. The electrolyte of claim 1, wherein the electrolyte has a weight loss of about 15% or less at about 150° C. to about 200° C., as measured by thermogravimetric analysis.

12. The electrolyte of claim 1, wherein the electrolyte has a region with a constant current in a voltage range of about 3 volts to about 4.6 volts, and a decomposition onset potential of about 4.8 volts or greater, as measured by linear sweep voltammetry.

13. The electrolyte of claim 1, wherein the glyme solvent comprises a compound in which the lithium salt has a solubility of about 5 moles per liter or greater at 25° C.

14. The electrolyte of claim 1, wherein the lithium salt comprises $Li(FSO_2)_2N$, and
wherein the glyme solvent comprises at least one selected from ethylene glycol dimethyl ether, and ethylene glycol diethyl ether.

15. An electrolyte for a lithium metal battery, the electrolyte consisting essentially of:
a solvated ionic liquid comprising a glyme solvent and a lithium salt; and
lithium ion conductive polymer,
wherein an amount of the lithium salt is about 3 moles per liter or greater, and
wherein a lithium metal battery comprising the electrolyte has an initial solution resistance of less than about 1 ohm and a bulk resistance of less than about 10 ohms.

16. The electrolyte of claim 15, wherein the lithium ion conductive polymer comprises at least one selected from a polyethylene oxide, a polyvinyl alcohol, a polyvinylpyrrolidone, a polyethylene glycol diacrylate, and a polyethylene glycol dimethacrylate.

17. A lithium metal battery comprising:
a lithium negative electrode comprising a lithium metal or a lithium metal alloy;
a positive electrode; and
the electrolyte of claim 1 between the lithium negative electrode and the positive electrode.

18. The lithium metal battery of claim 17, wherein a lithium deposition layer on the lithium negative electrode has a lithium deposition density of about 0.2 gram per cubic centimeter to about 0.53 gram per cubic centimeter.

19. The lithium metal battery of claim 17, wherein the lithium metal battery has a capacity retention of about 85% or greater after 100 cycles of charging and discharging.

20. A method of manufacturing the lithium metal battery of claim 17, the method comprising:
mixing a glyme solvent and a lithium salt to obtain an electrolyte precursor;
disposing the electrolyte precursor into the lithium metal battery; and
performing hermetic immersion of the electrolyte precursor in the lithium metal battery to manufacture the lithium metal battery.

21. The method of claim 20, wherein the electrolyte precursor has a viscosity of about 1 centipoise to about 3 centipoise.

22. The method of claim 20, wherein an amount of the lithium salt in the electrolyte precursor is about 2.5 moles per liter or less.

23. The method of claim 20, wherein an amount of the lithium salt in the electrolyte precursor is from about 0.8 moles per liter to about 2 moles per liter.

24. The method of claim 20, wherein the electrolyte has a viscosity of about 2.5 centipoise or greater after the hermetic immersion.

25. The method of claim 20, wherein an amount of the lithium salt in the electrolyte is about 3 moles per liter or greater after the hermetic immersion.

26. The method of claim 20, wherein the hermetic immersion is performed at about 60° C. or less.

27. The method of claim 26, wherein the hermetic immersion is performed at about 30° C. to about 60° C.

28. The method of claim 26, wherein the hermetic immersion is performed for about 10 hours or less.

29. The method of claim 26, wherein the hermetic immersion is performed for about 2 hours to about 6 hours.

* * * * *